US012349731B2

(12) United States Patent
Rado

(10) Patent No.: US 12,349,731 B2
(45) Date of Patent: Jul. 8, 2025

(54) PERSONAL VAPORIZER HAVING A HEATED WALL

(71) Applicant: VAPOROUS TECHNOLOGIES, INC., Torrance, CA (US)

(72) Inventor: J. Christian Rado, Torrance, CA (US)

(73) Assignee: VAPOROUS TECHNOLOGIES, INC., Torrance, CA (US)

(*) Notice: Subject to any disclaimer, the term of this patent is extended or adjusted under 35 U.S.C. 154(b) by 0 days.

(21) Appl. No.: 18/454,010

(22) Filed: Aug. 22, 2023

(65) Prior Publication Data

US 2023/0389610 A1 Dec. 7, 2023

Related U.S. Application Data

(63) Continuation of application No. 16/849,979, filed on Apr. 15, 2020, now Pat. No. 11,730,201.

(60) Provisional application No. 62/834,327, filed on Apr. 15, 2019.

(51) Int. Cl.

*A24F 40/46* (2020.01)
*A24F 40/485* (2020.01)
*H05B 3/18* (2006.01)

(52) U.S. Cl.

CPC ............ *A24F 40/46* (2020.01); *A24F 40/485* (2020.01); *H05B 3/18* (2013.01); *H05B 2203/007* (2013.01)

(58) Field of Classification Search

CPC ......... A24F 40/20; A24F 40/46; A24F 40/485
See application file for complete search history.

(56) References Cited

U.S. PATENT DOCUMENTS

| | | | |
|---|---|---|---|
| 2,104,266 | A | 1/1938 | McCormick |
| 3,200,819 | A | 8/1965 | Gilbert |
| 3,788,330 | A | 1/1974 | Griffith |
| 4,292,983 | A | 10/1981 | Mensik |
| 4,947,874 | A | 8/1990 | Brooks et al. |
| 6,532,965 | B1 | 3/2003 | Abhulimen et al. |
| 6,543,448 | B1 | 4/2003 | Smith et al. |
| 7,832,410 | B2 | 11/2010 | Hon |
| 7,997,280 | B2 | 8/2011 | Rosenthal |
| 8,156,944 | B2 | 4/2012 | Han |
| 8,365,742 | B2 | 2/2013 | Hon |
| 8,375,957 | B2 | 2/2013 | Hon |
| 8,528,569 | B1 | 9/2013 | Newton |
| 8,794,231 | B2 | 8/2014 | Thorens et al. |

(Continued)

FOREIGN PATENT DOCUMENTS

| | | | |
|---|---|---|---|
| KR | 20130106009 | A | 9/2013 |
| WO | WO2019057939 | A1 | 3/2019 |
| WO | WO2020003116 | A1 | 1/2020 |

*Primary Examiner* — Hae Moon Hyeon

(74) *Attorney, Agent, or Firm* — FisherBroyles, LLC; Glen L Nuttall

(57) ABSTRACT

A personal vaporizer includes a heating element having a generally upside-down cup shape. An air warming space is defined within the cup shape, and intake air is delivered into the air warming space. Vaporization media is delivered adjacent a top wall of the heating element. The heating element warms the vaporization media so that it flows downwardly along a side wall of the heating element. The side wall of the heating element is heated sufficient to atomize the vaporization media. Warmed intake air from the air warming space is drawn through the atomized media, forming a vapor that can be inhaled by a user.

11 Claims, 19 Drawing Sheets

(56) References Cited

U.S. PATENT DOCUMENTS

| | | | | |
|---|---|---|---|---|
| 8,899,238 | B2 | 12/2014 | Robinson et al. | |
| 8,915,254 | B2 | 12/2014 | Monsees et al. | |
| 8,925,555 | B2 | 1/2015 | Monsees et al. | |
| 9,254,007 | B2 | 2/2016 | Liu | |
| 9,380,811 | B2 | 7/2016 | Chung | |
| 9,456,632 | B2 | 10/2016 | Hon | |
| 9,462,832 | B2 | 10/2016 | Lord | |
| 9,532,599 | B2 | 1/2017 | Liu | |
| 9,603,389 | B2 | 3/2017 | Chen | |
| 9,750,284 | B2 | 9/2017 | Rado | |
| 10,004,264 | B2 | 6/2018 | Rado | |
| 10,021,909 | B2 | 7/2018 | Rado | |
| 10,085,481 | B2 | 10/2018 | Verleur et al. | |
| 10,188,145 | B2 | 1/2019 | Rado | |
| 10,219,541 | B2 | 3/2019 | Rado | |
| 10,244,792 | B2 | 4/2019 | Rado | |
| 10,321,721 | B2 | 6/2019 | Rado | |
| 10,327,470 | B2 | 6/2019 | Rado | |
| 10,413,685 | B2 * | 9/2019 | Lindars | A61M 15/06 |
| 10,791,762 | B2 | 10/2020 | Liu | |
| 10,791,763 | B2 | 10/2020 | Chen | |
| 10,893,703 | B2 | 1/2021 | Chen | |
| 10,893,706 | B2 | 1/2021 | Wei et al. | |
| 10,993,475 | B2 | 5/2021 | Chen | |
| 11,330,840 | B2 | 5/2022 | Fernando et al. | |
| 11,730,201 | B2 * | 8/2023 | Rado | A24F 40/485 131/328 |
| 2009/0293888 | A1 | 12/2009 | Williams et al. | |
| 2011/0061649 | A1 | 3/2011 | Hirshberg | |
| 2011/0094523 | A1 | 4/2011 | Thorens et al. | |
| 2013/0152922 | A1 | 6/2013 | Benassayag et al. | |
| 2013/0247910 | A1 | 9/2013 | Postma | |
| 2013/0306065 | A1 | 11/2013 | Thorens et al. | |
| 2014/0000638 | A1 | 1/2014 | Sebastian et al. | |
| 2014/0041655 | A1 | 2/2014 | Barron et al. | |
| 2014/0123989 | A1 | 5/2014 | Lamothe | |
| 2014/0261488 | A1 | 9/2014 | Tucker | |
| 2015/0144148 | A1 | 5/2015 | Chen | |
| 2015/0208729 | A1 | 7/2015 | Monsees et al. | |
| 2015/0208730 | A1 | 7/2015 | Li et al. | |
| 2015/0245662 | A1 | 9/2015 | Memari et al. | |
| 2015/0272218 | A1 | 10/2015 | Chen | |
| 2016/0095357 | A1 | 4/2016 | Burton | |
| 2016/0183596 | A1 * | 6/2016 | Rado | F22B 1/284 392/404 |
| 2016/0360790 | A1 | 12/2016 | Calfee | |
| 2017/0027223 | A1 | 2/2017 | Eksouzian | |
| 2017/0027232 | A1 | 2/2017 | Scheck et al. | |
| 2017/0119059 | A1 | 5/2017 | Zuber et al. | |
| 2017/0135404 | A1 | 5/2017 | Reevell | |
| 2017/0354186 | A1 | 12/2017 | Johnson et al. | |
| 2018/0177240 | A1 | 6/2018 | Duque et al. | |
| 2020/0015524 | A1 * | 1/2020 | Rado | A24F 40/46 |
| 2020/0196662 | A1 | 6/2020 | Fernando et al. | |
| 2020/0359691 | A1 * | 11/2020 | Lindars | A24F 40/48 |

* cited by examiner

PERSONAL VAPORIZER HAVING A HEATED WALL

CROSS-REFERENCE TO RELATED APPLICATIONS

This application is a continuation of U.S. Ser. No. 16/849,979, filed Apr. 15, 2020, which claims priority to U.S. Application Ser. No. 62/834,327, which was filed Apr. 15, 2019, the entirety of which is hereby incorporated by reference.

BACKGROUND

The present disclosure relates to the field of personal vaporizers.

Personal Vaporizers are handheld devices that vaporize a vaporizing medium such as a wax, ground herb, or fluid incorporating essential oils and/or other components. The vapor is then inhaled by its user.

In typical vaporizers, vaporizing media M is delivered onto or adjacent an atomizer, which includes a heating element such as a wire heating coil. The heating element heats the media M so that it is atomized-dispersed into very fine droplets or particles. Intake air A is drawn through the atomized vaporizing media M, and the atomized media M becomes entrained in the air A so as to form a vapor V. The vapor V is then drawn through a mouthpiece and to a user's mouth.

The intake air may be warmed when at the heating coil. However, such warming may be inconsistent, and may reduce the amount of heat available for atomization. Also, some types of media, such as waxes, may not substantially flow at room temperature. Thus, it can be difficult to deliver such media from a tank or the like to the atomizer for vaporization. Further, traditional vaporizers that use a heating coil typically only atomize in a relatively limited area of the device at or immediately adjacent the coil.

SUMMARY

The present disclosure discloses aspects that improve personal vaporizers. For example, some embodiments disclose structure that provides for warming of intake air prior to such air entering a vaporization chamber. Additional embodiments provide warming at and adjacent a tank or media receiving bowl to decrease the viscosity of high-viscosity vaporization media such as waxes so as to enable such media to flow to a vaporization space. Further embodiments increase the footprint of the vaporizer that is available for vaporization of media. Yet additional embodiments disclose improved air pathway management to enhance vapor pickup by intake air. Yet further embodiments combine structural aspects disclosed herein, and can combine with further aspects including anti-leak structures, portability, operational electronics, improved flow paths, and the like.

In conjunction with one embodiment, the present disclosure provides a personal vaporizer, comprising an atomizer module having an atomizer bowl opening toward a top end and defining a bowl space, and a heating element disposed within the atomizer bowl. The heating element has a top wall and a tubular side wall extending downwardly from the top wall. An air warming space is defined within the heating element. The heating element is configured to atomize a vaporization media when actuated. A vaporization space is defined between the heating element side wall and the atomizer bowl. A vaporization media is disposed in the vaporization space on a first surface of the heating element side wall. When the heating element is actuated and air is drawn through the vaporizer, the intake air is drawn into the air warming space and along a second surface of the heating element side wall before flowing into the vaporization space.

Another embodiment additionally comprises a mouthpiece module releasably connectable to the atomizer module, the mouthpiece module comprising a media carrier adapted to carry the vaporization media, wherein when the mouthpiece module is connected to the atomizer module, the vaporization media carried by the media carrier is immediately adjacent the heating element top surface.

In yet another embodiment, the heating element is configured to, when actuated, melt but not atomize vaporization media upon the top surface so that the melted vaporization media flows off of the top surface to the first surface of the side wall in the vaporization space, and wherein the heating element is configured so that, when actuated, vaporization media at and adjacent the first surface of the side wall is atomized.

In still another embodiment, the heating element is configured to be hotter along the tubular side wall than along the top wall. In some such embodiments, a bottom wall of the atomizer bowl comprises an air aperture configured to direct intake air into the air warming space. In further such embodiments, an elongated air guide extends through the bottom wall of the atomizer bowl, the air aperture being formed by the elongated air guide, and a side wall of the elongated air guide extends proximally from the bottom wall of the atomizer bowl.

In yet other embodiments a plurality of spaced apart blocks extend proximally from the bottom wall of the atomizer bowl, and wherein a distal end of the heating element side wall rests upon the blocks, and a fluid path is defined through spaces between the spaced apart blocks.

In accordance with another embodiment, the present specification provides a method of vaporizing a vaporization media. The method comprises applying a vaporization media onto a first surface of a heating element, actuating the heating element to warm the first surface so that the vaporization media on the first surface of the heating element is melted but not atomized so that the melted vaporization media flows to a second surface of the heating element, and actuating the heating element to heat the second surface sufficiently so that the vaporization media on the second surface is atomized.

Another embodiment additionally comprises directing an input air flow across a third surface of the heating element while the heating element is actuated so as to warm the input air, then directing the input air across the second surface and through the atomized vaporization media.

In some such embodiments, the heating element has a first portion and a second portion, and the first surface and the third surface are on the first portion and on opposite sides of the first portion, and the second surface is on the second portion. In further embodiments, when the heating element is actuated, the second portion is hotter than the first portion.

In accordance with yet another embodiment, the present specification provides a method of vaporizing a vaporization media. The method comprises actuating a heating element having a first surface and a second surface so that a vaporization media on the second surface is atomized, drawing an input air across the first surface so that heat from the first surface warms the air, and after the air has been warmed, drawing the input air across the second surface and through the atomized vaporization media. No vaporization media is on the first surface.

Some embodiments additionally comprises changing a flow path direction of the input air more than 90° between the first surface and the second surface. In some such embodiments, the heating element has a top wall and a side wall depending from the top wall, and an air warming space is defined within the top and side wall, and the first surface is within the air warming space. In additional embodiments, the second surface is arranged on the heating element side wall on a side opposite the air warming space.

DESCRIPTION

Figure 1:
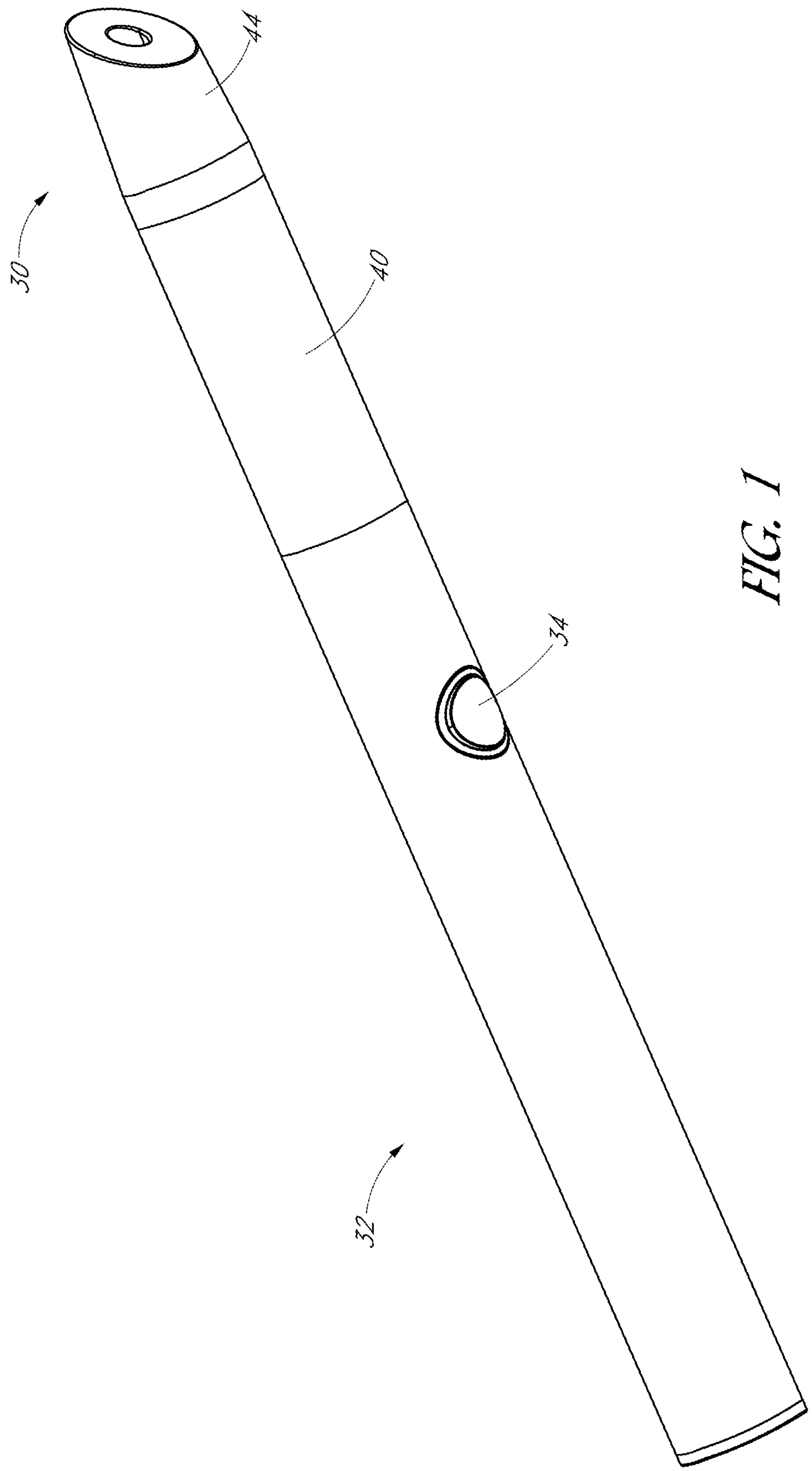
FIG. 1 is a perspective view of an embodiment of a personal vaporizer assembled with a battery module.
Figure 2:
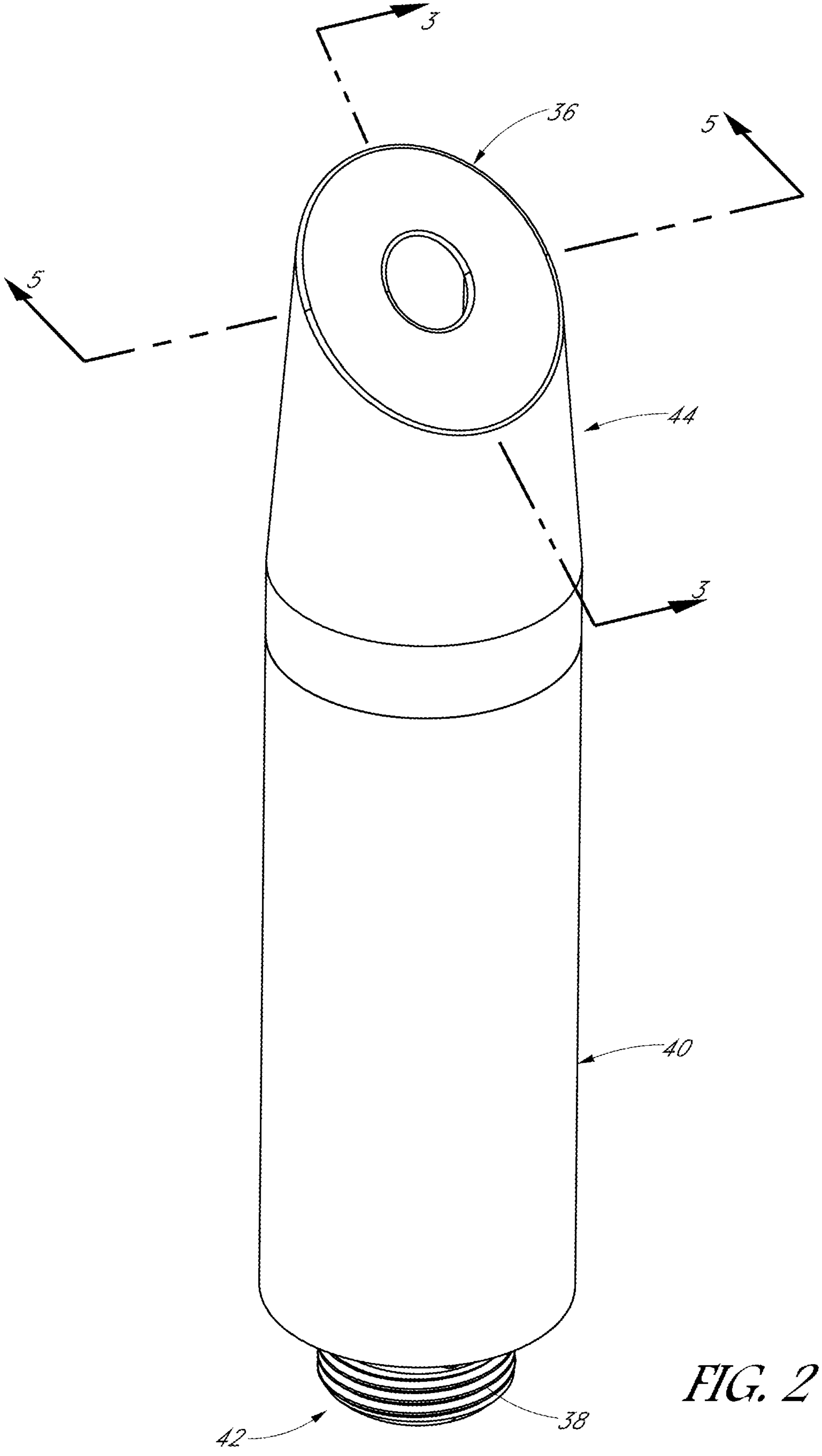
FIG. 2 is a perspective view of the vaporizer portion of the configuration of FIG. 1.
Figure 3:
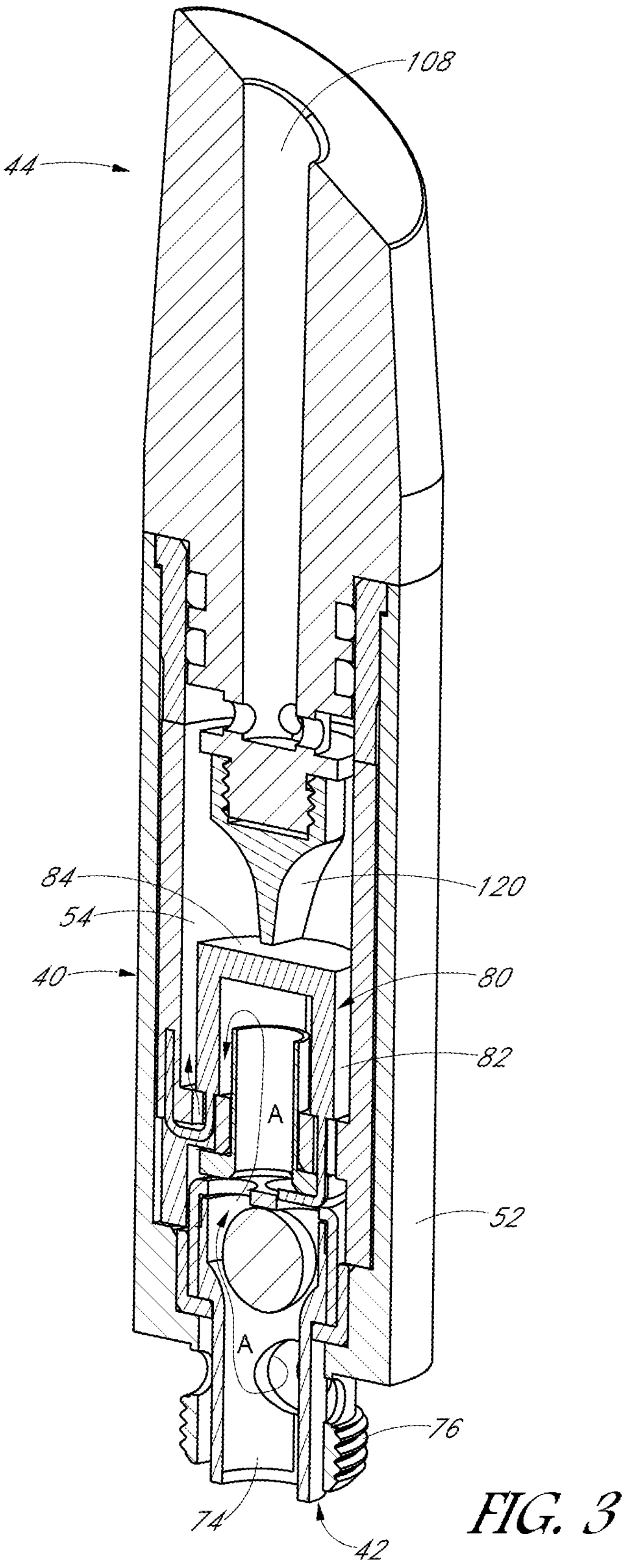
FIG. 3 is a perspective cross-sectional view taken along line 3-3 of FIG. 2.

With initial reference to FIGS. 1 and 2, an embodiment of a personal vaporizer 30 is selectively attachable to a battery module 32. Applicant's U.S. Pat. No. 10,188,145 (the "145 patent) describes embodiments of personal vaporizers, attributes of personal vaporizers, and structure that is relevant to the embodiments disclosed herein. The '145 patent also discusses interaction of vaporizer embodiments with batteries. The entirety of the '145 patent is hereby incorporated by reference herein.

The battery module 32 preferably comprises a rechargeable battery pack actuable via a button 34 that communicates inputs to an electronic controller enclosed within the module case. The controller can include electronic circuitry configured to detect button inputs and interpret such inputs so as to control how and when electric current is delivered by the battery module 32.

The vaporizer 30 preferably comprises an upper, or proximal, end 36 and a lower, or distal, end 38. An atomizer module 40 extends proximally from the distal end 38. A battery mount 42 at the distal end 38 of the atomizer module 40 preferably is configured to engage a proximal mount boss of the battery module 32. A mouthpiece module 44 is detachably attached to the atomizer module 40 and extends proximally therefrom to the proximal end 36 of the vaporizer 30.

With additional reference to FIGS. 3-7, the atomizer module 40 preferably comprises a bowl 50 enclosed within an atomizer case 52. The bowl 50 preferably is defined by a side wall 54 and a bottom wall 56, and is open at the top, or proximal, end. The bowl side wall 54 and bottom wall 56 preferably define a bowl space 58 therewithin. An air guide 60 extends through an aperture formed through the bottom wall 56. In the illustrated embodiment, the air guide 60 is formed separately from the bowl 50 and includes an elongated tubular portion 62 and an insert flange 64. The elongated air guide tubular portion 62 defines an air pathway through which intake air A can flow. As shown, the air guide 60 can be inserted through the aperture in the bottom wall 56 of the bowl 50 until the insert flange 64 engages the bottom wall 56, preventing further proximal advancement of the air guide 60.

In the illustrated embodiment, a check valve 70 is disposed distal of the air guide 60. The illustrated check valve 70 preferably resembles and operates in a manner similar to embodiments discussed in Applicant's US 2016/0183596 (the '596 publication), which also describes additional structure relevant to personal vaporizers, and which is also incorporated by reference herein in its entirety. The illustrated check valve 70 comprises an electrically conductive body comprising a connector pin 74 that extends distally of a base pin 76 defined at a distal end of the atomizer case 52. The atomizer case 52 preferably also is electrically conductive, and an insulating sleeve 78 preferably electrically insulates the atomizer case 52 from the conductive check valve 70. Preferably, the connector pin 74 and base pin 76 are configured so that when the vaporizer 30 is attached to the battery module mount boss, the connector pin 74 and base pin 76 engage opposite poles of the battery module 32.

As noted above, the bowl side wall 54 and bottom wall 56 preferably define the bowl space 58 therewithin. In the illustrated embodiment, a heating element 80 is arranged in the bowl space 58. The illustrated heating element 80 is formed with an inverted cup shape defined by a tubular side wall 82, a top wall 84, and an open distal end. An air warming space 86 is defined within the heating element 80, and the air guide 60 extends into and opens into the air warming space 86.

The illustrated heating element 80 is made of a ceramic and/or other heat-conductive material into which a heating wire is embedded, preferably in a coiled configuration. In a preferred embodiment, the heating wire comprises a resistance wire that is configured to generate substantial heat when electric current flows therethrough. A first wire end 93 and a second wire end 95 extend from distal ends of the side wall. When an electric current is applied between the first and second wire ends 93, 95, the heating element 80 is actuated. In some embodiments, the heating coil is embedded only within the side wall 82 so that the highest heat intensity is applied at the side wall 82. In some embodiments a portion of the heating wire may be embedded within the top wall 84, but at a much lower density than in the side wall 82 so that the maximum temperature of the heating element 80 is located along the side wall 82 and the top wall 84 generally is not as hot as the side wall 82.

Figure 4:
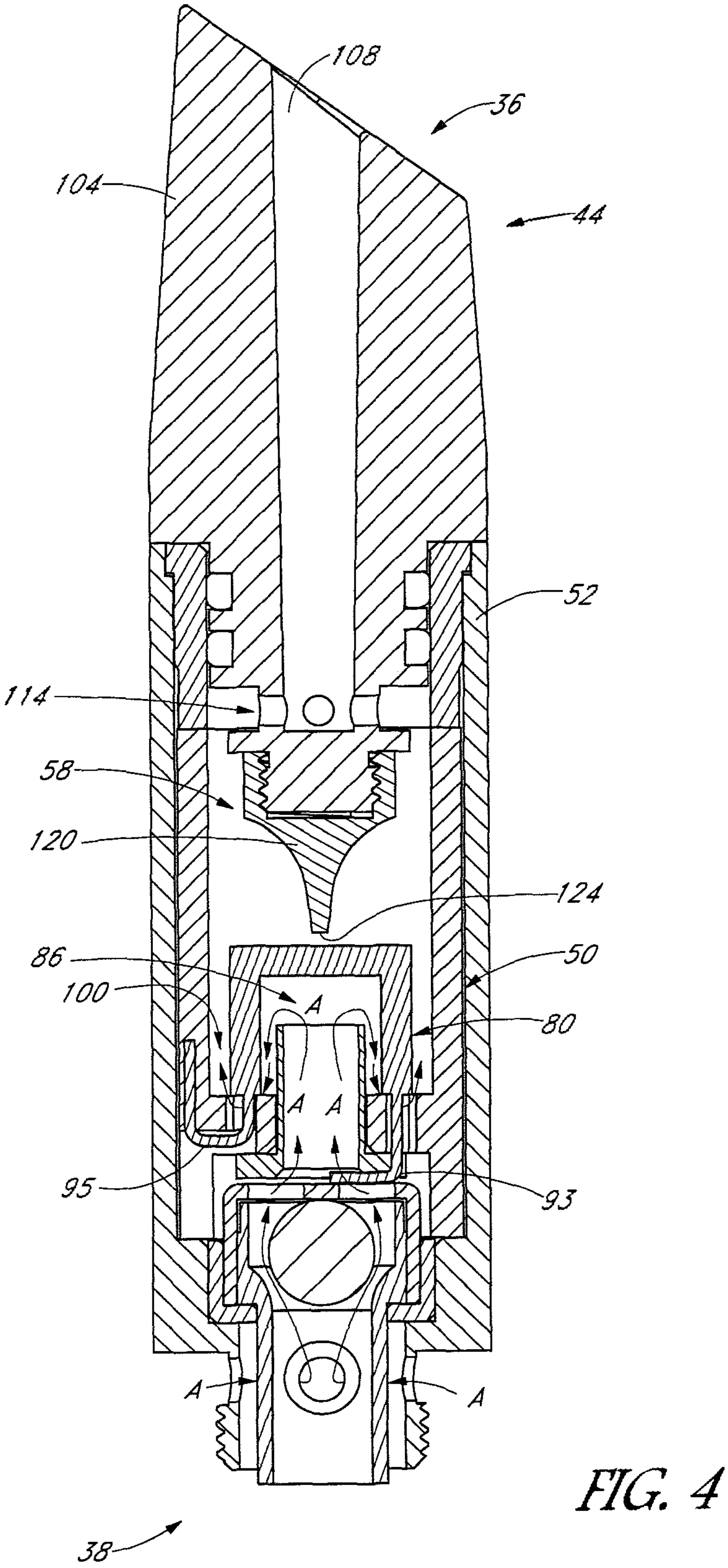
FIG. 4 is an orthographic view of the configuration of FIG. 3.
Figure 5:
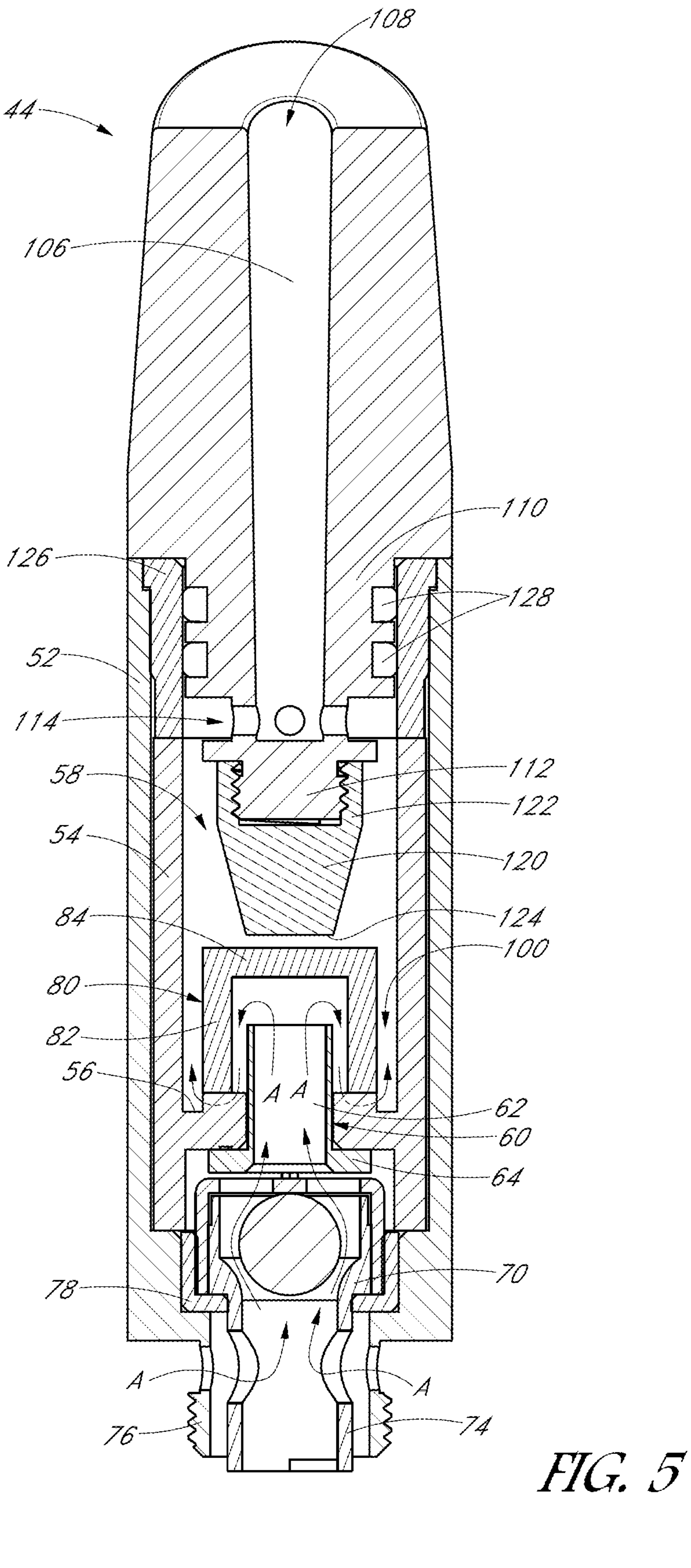
FIG. 5 is a cross-sectional view taken along line 5-5 of FIG. 2.
Figure 7:
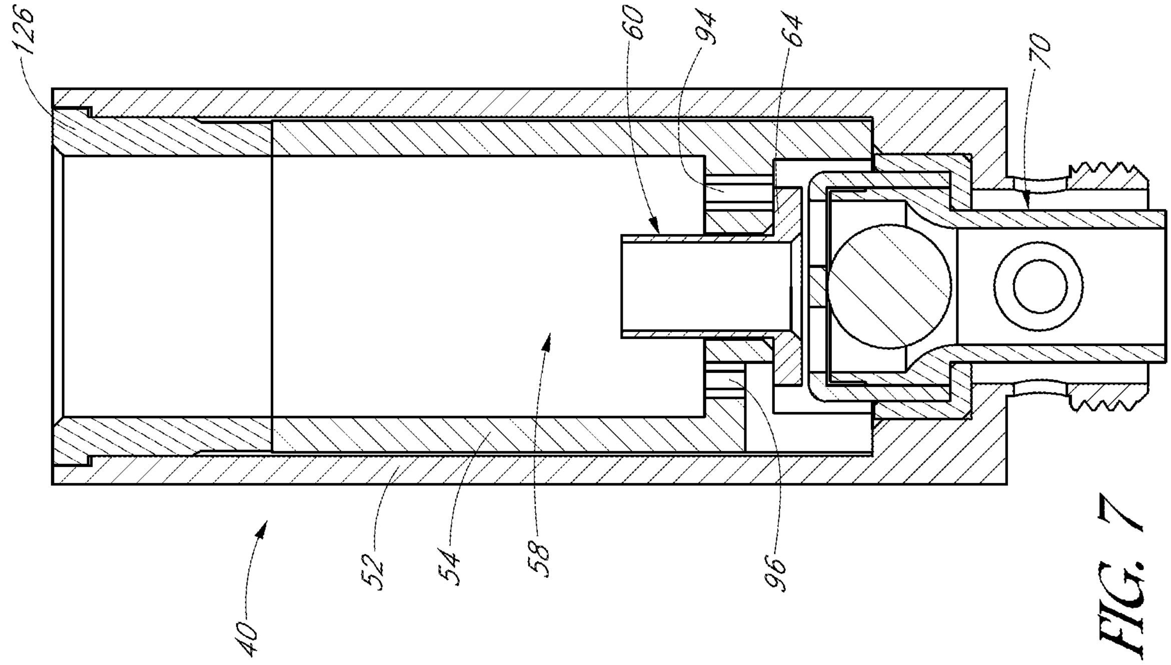
FIG. 7 is an orthographic view of the configuration of FIG. 6.
Figure 6:
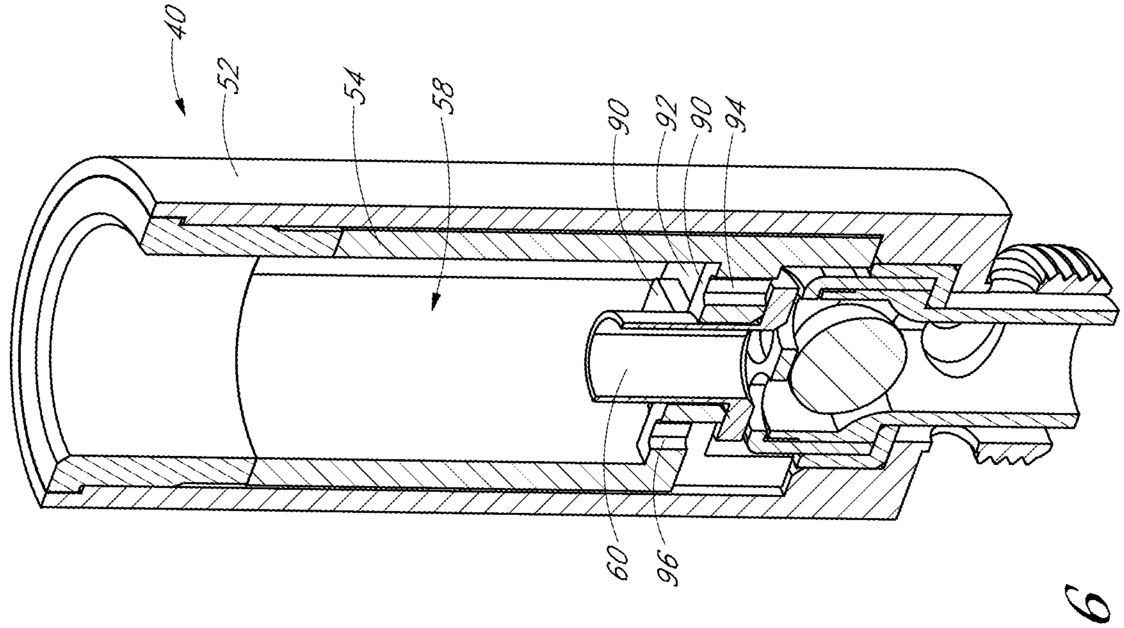
FIG. 6 is a perspective view of the configuration of FIG. 3 with the mouthpiece module and heating element removed.
Figure 8:
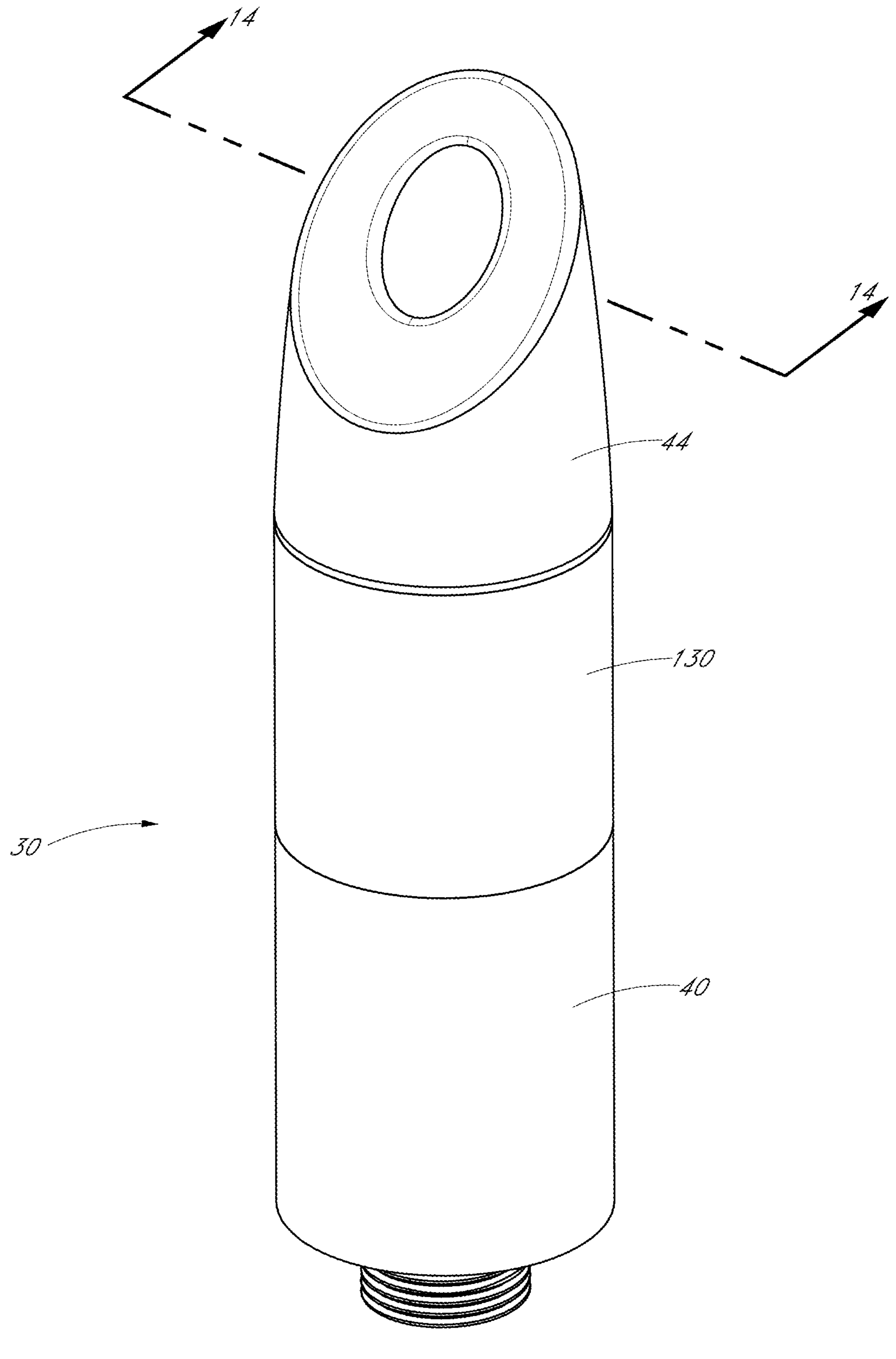
FIG. 8 is a perspective view of another embodiment of a vaporizer.
Figure 9:
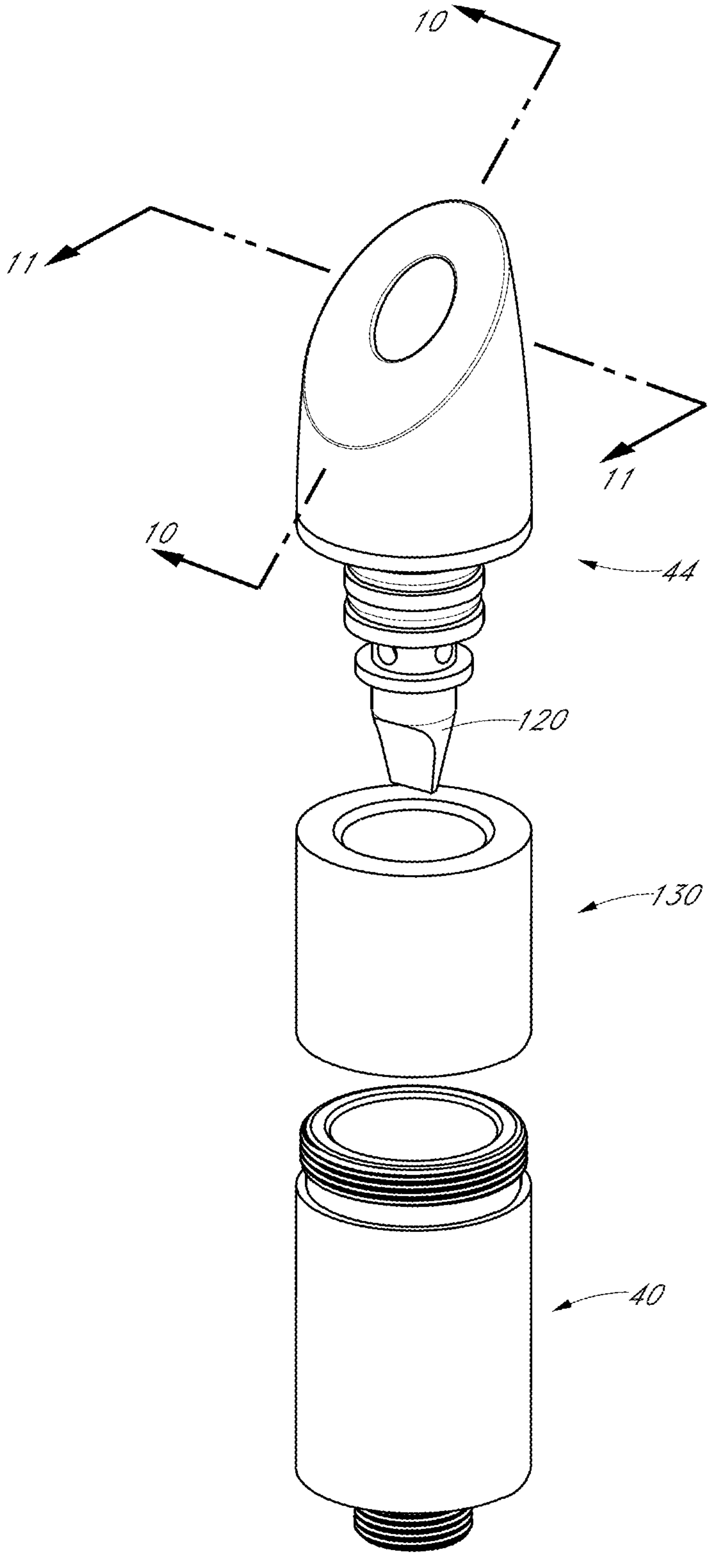
FIG. 9 is an exploded perspective view of an embodiment of the vaporizer of FIG. 8.
Figure 10:
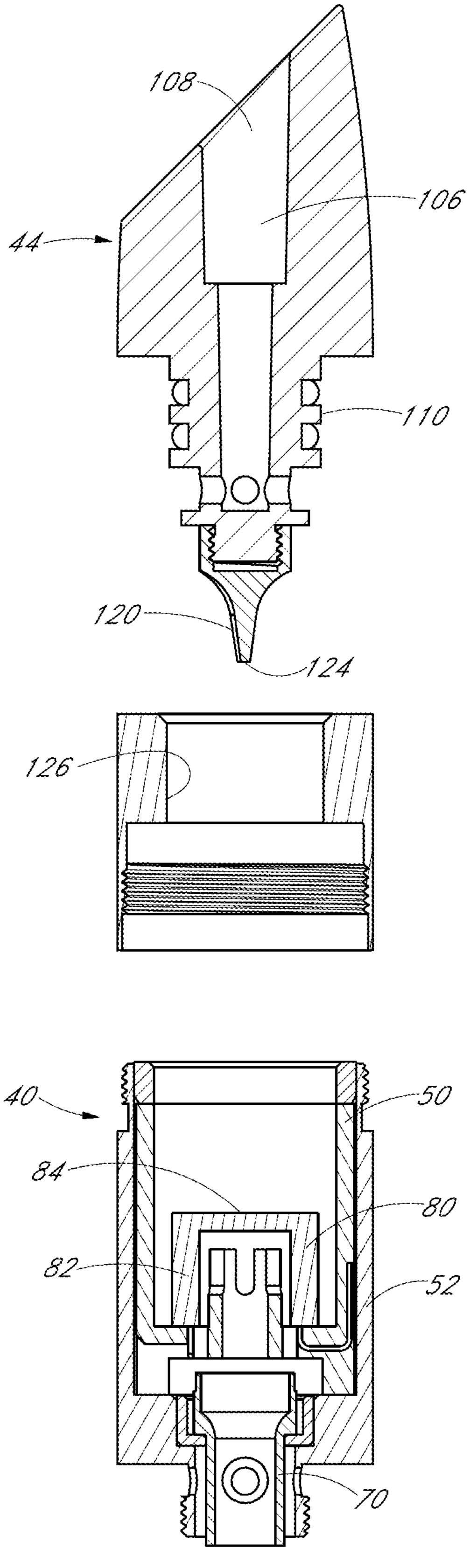
FIG. 10 is a cross-sectional view taken along line 10-10 of FIG. 9.
Figure 11:
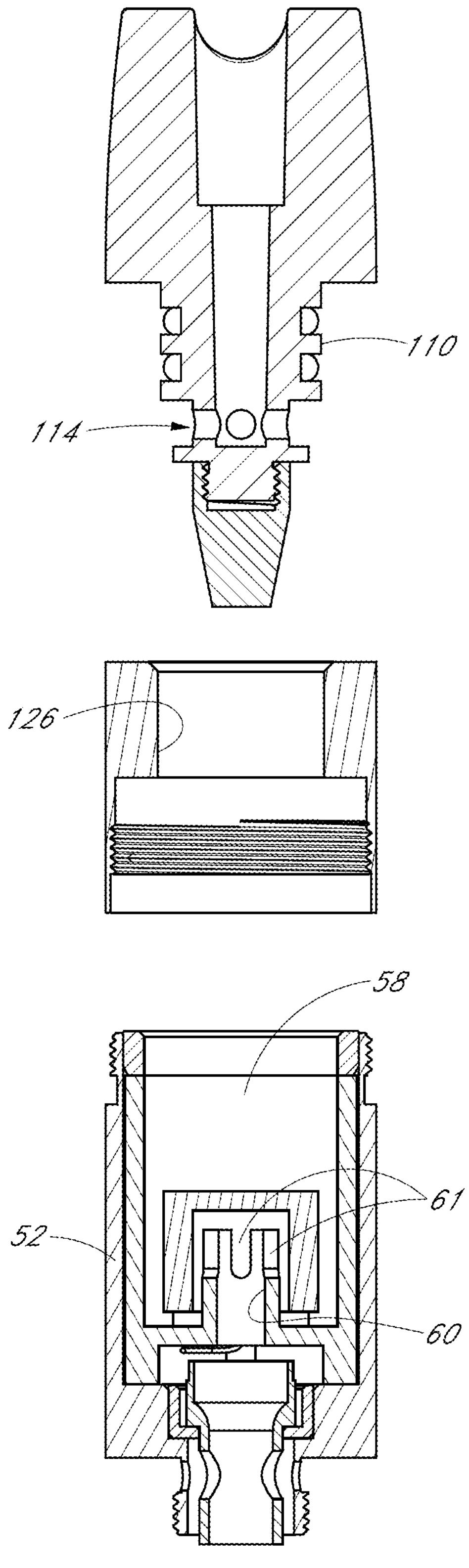
FIG. 11 is a cross-sectional view taken along line 11-11 of FIG. 9.
Figure 12:
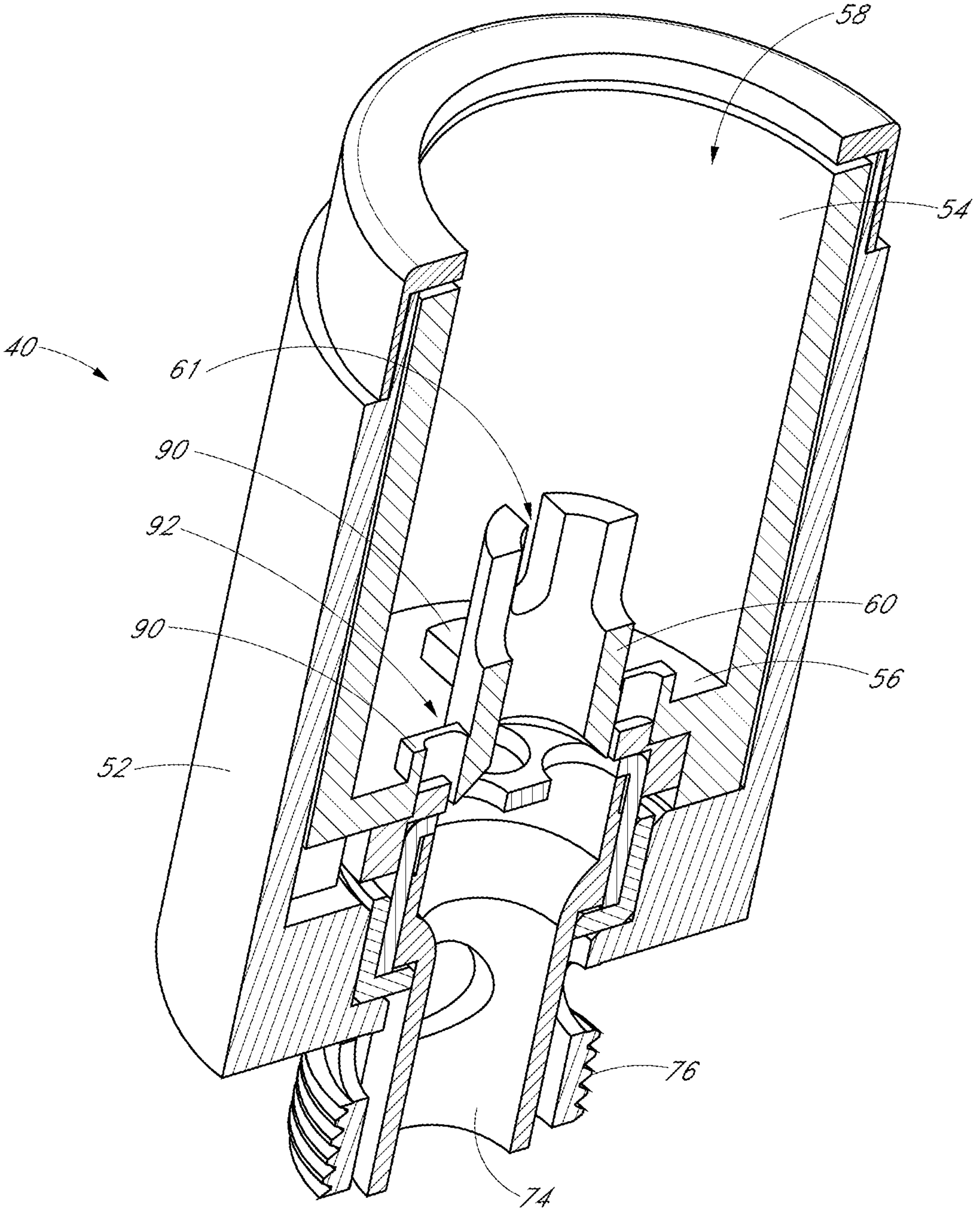
FIG. 12 is a perspective cross-sectional view of an embodiment of an atomizer case.
Figure 13:
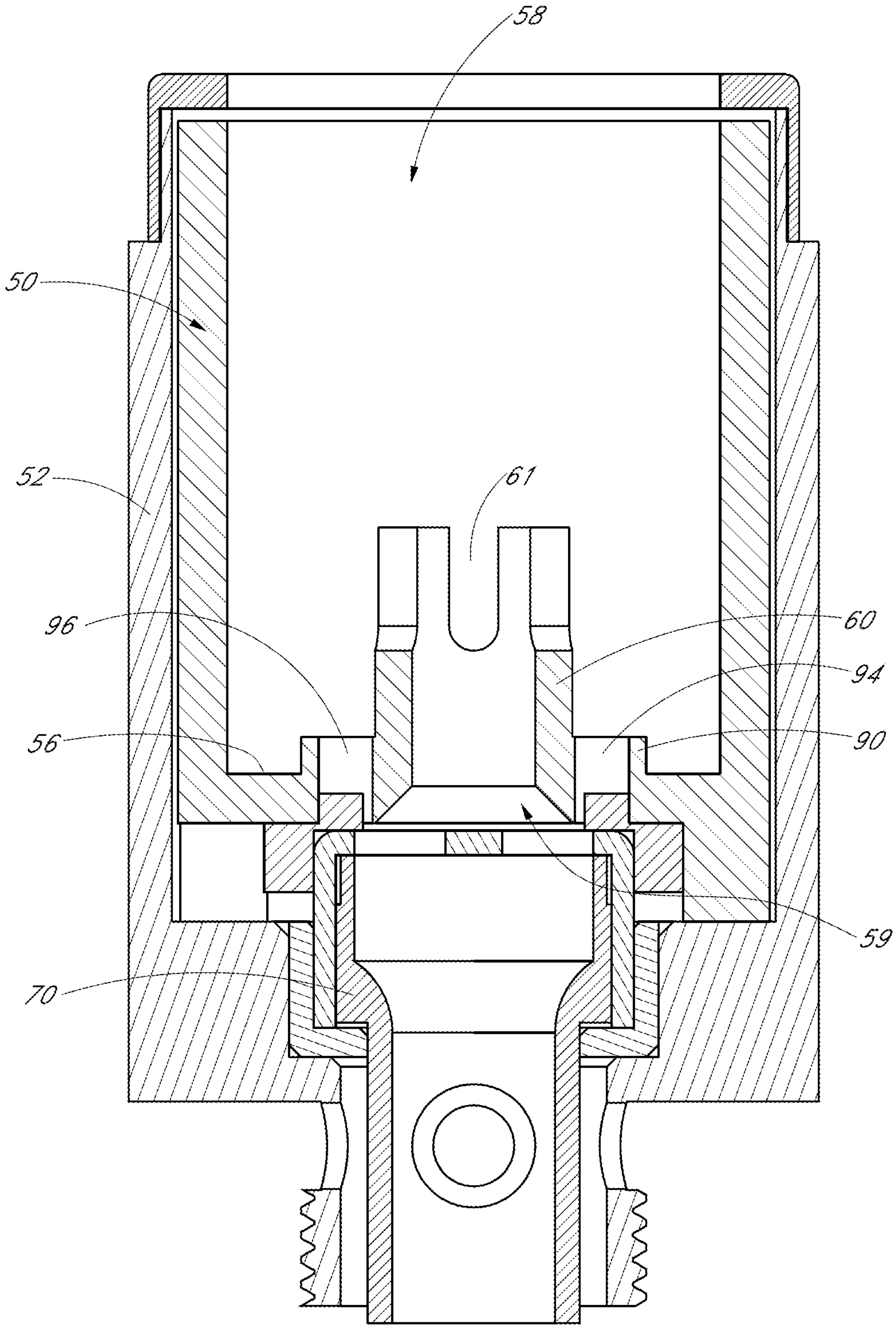
FIG. 13 is an orthographic view of the configuration of FIG. 12.

As best shown in FIGS. 6 and 7, a plurality of blocks 90 extend upwardly from the bottom wall 56 of the bowl 50. Spaces 92 are provided between adjacent blocks 90. Two of the blocks 90 include a wire slot 94, 96 configured to accommodate one of the first and second wire ends. Thus, as shown in FIG. 4, the first wire end 93 extends through the corresponding wire slot 94 and through the bottom wall 56 and into contact with the conductive check valve so as to be electrically in communication with a first pole of the battery module, and the second wire end 95 extends through the corresponding wire slot 96 and through the bottom wall 56 of the bowl 50 and is bent so as to be placed into engagement with the atomizer case 52, and thus be in electrical communication with a second pole of the battery module 32.

The distal surface of the heating element 80 rests upon the blocks 90. As such, the spaces 92 between blocks 90 define a pathway for air A within the air warming space 86 to pass between the side wall 82 distal surface and the bottom surface 56 of the bowl 50. Environmental air A can be drawn through the check valve 70 and flow proximally through the bowl bottom wall aperture and air guide 60 into the air warming space 86, in which it is warmed and redirected 180° so as to flow distally between the heating element side wall 82 and the air guide 60 towards the bottom wall 56 of the bowl 50, and further through the spaces 92 between blocks 90 into a vaporization space 100 defined between the side wall 82 of the heating element 80 and the side wall of the bowl 50.

The illustrated mouthpiece module 44 comprises an elongated mouthpiece body 104 through which a longitudinally-extending mouthpiece passage 106 is formed. A vapor outlet 108 opens at the proximal end of the mouthpiece body 104. A mouthpiece connector 110 is disposed in a distal portion of the mouthpiece body 104 and terminates at a media connector 112 which, in the illustrated embodiment, is a threaded connector. A plurality of redirect passages 114 immediately proximal of the media connector 112 and distal of the mouthpiece connector 110 extend in directions transverse to the mouthpiece passage. The redirect passages 114 communicate with the mouthpiece passage 106.

A media carrier 120 is releasably attachable to the media connector. In the illustrated embodiment, the media carrier 120 comprises a threaded proximal connector adapter 122 to be threaded onto the media connector 112. Distal of the proximal connector adapter 122, the illustrated media carrier 120 has a tapered tab shape and terminates at a tip 124.

A mouthpiece receiver 126 is disposed within the atomizer case 52 proximal of the bowl 50. The mouthpiece connector 110 is sized to fit complementarity within the mouthpiece receiver 126 and comprises a pair of O-rings 128. As such, the mouthpiece connector 110 can be advanced into the mouthpiece receiver 126 so that the O-rings 128 sealingly engage the inner surface of the mouthpiece receiver 110 and hold the mouthpiece module 44 securely, though releasably, in place connected to the atomizer module 40 so that the mouthpiece passage 106 communicates with the bowl space 58 via the redirect passages 114. Also, when the mouthpiece module 44 is attached to the atomizer module 40, the media carrier 120 extends into the bowl space 58 so that the tip 124 of the media carrier 120 is immediately proximal of the top wall 84 of the heating element 80. A fluid pathway is thus established from air inlets of the check valve 70 through the air warming space 86 to the vaporization space 100 and further through the bowl space 58 past the media carrier 120 to and through the redirect passages 114 into the mouthpiece passage 106 and out the vapor outlet 108.

With reference next to FIGS. 8-13, another embodiment of a vaporizer 30 shares many similarities with the embodiment just described. However, an adapter module 130 is disposed between the atomizer module 40 and the mouthpiece module 44. The modules are detachably connectable one to another. In the illustrated embodiment, the adapter module 130 threadingly attaches to the proximal end of the atomizer module 40 and comprises the mouthpiece receiver 126 configured to receive the mouthpiece module 44 in a secure yet detachable configuration.

The atomizer module 40 comprises an atomizer case 52 enclosing a bowl 50, such as a heat-tolerant ceramic bowl 50 in which a surface of the bottom wall 56 and a surface of the side wall 54 define a bowl space 58. In the illustrated embodiment, an elongated tubular air guide is integrally formed as part of the bowl 50 and defines an air pathway through the bottom wall aperture. The tubular air guide 60 comprises a plurality of spaced-apart slots 61 extending distally from its proximal end. Preferably, a plurality of spaced apart blocks 90 are configured to support an inverted cup-shaped heat element in the manner as discussed above.

Figure 14A:
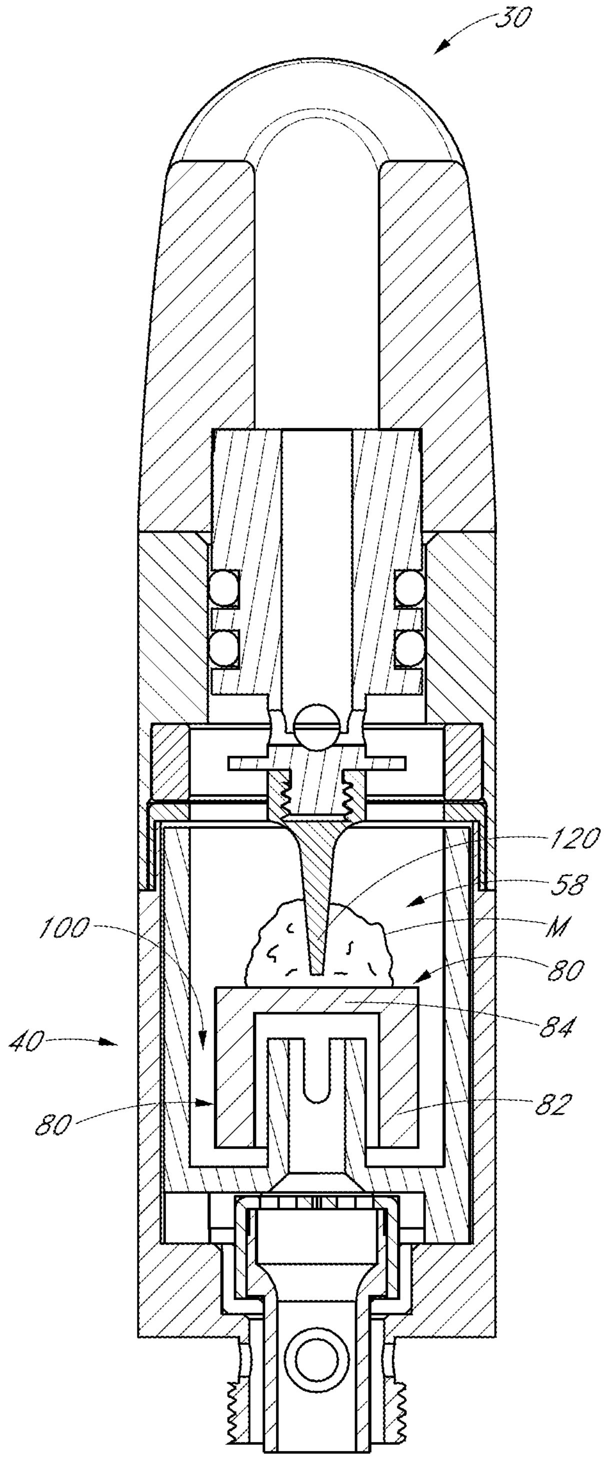
FIG. 14*a* is a cross-sectional view taken along line 14-14 of FIG. 8 depicted at a first instance during operation.
Figure 14B:
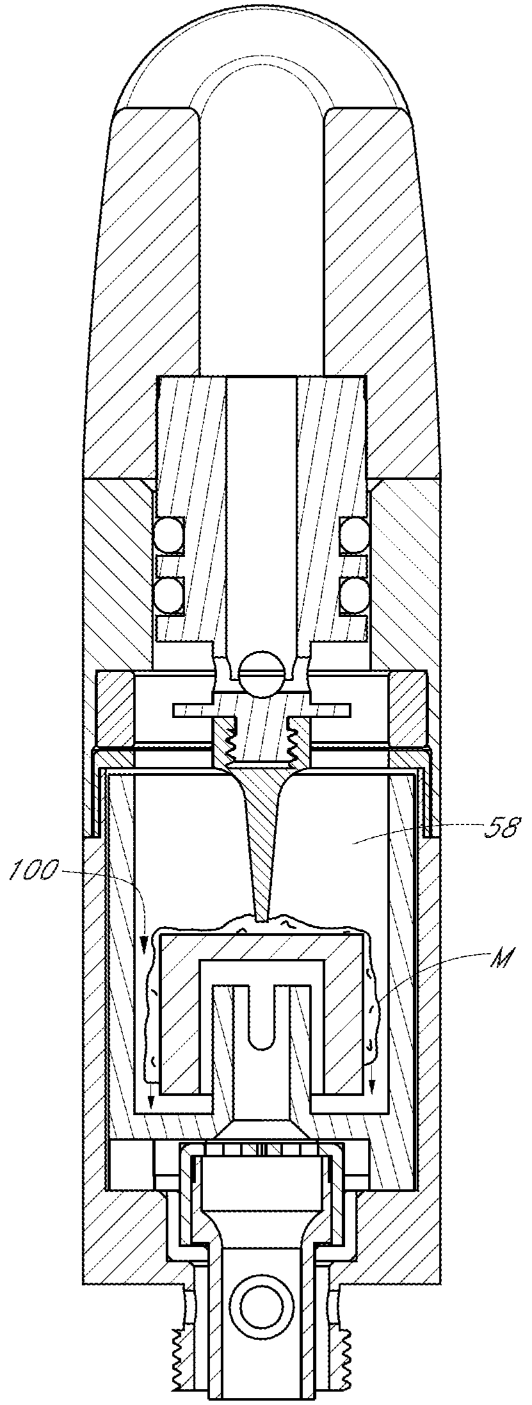
FIG. 14*b* shows the configuration of FIG. 14*a* at a second instance during operation.
Figure 14C:
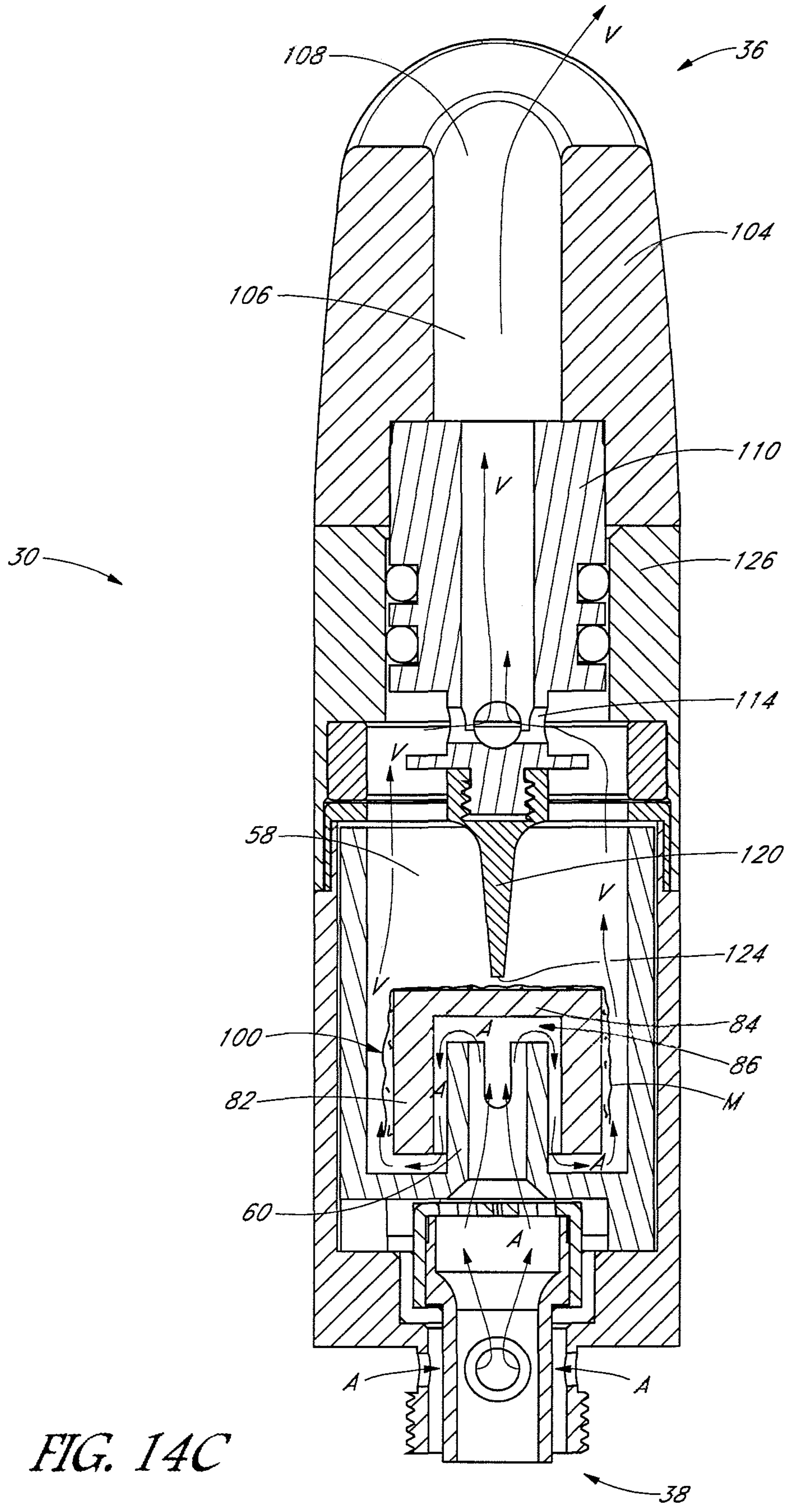
FIG. 14*c* shows the configuration of FIG. 14*a* at a third instance during operation.

With additional reference to FIGS. 14*a*-*c*, when the mouthpiece module 44 is removed from the atomizer module 40, a user can use the tab-shaped media carrier 120 to scoop up a portion of vaporizing medium M from the source of such media. This embodiment is particularly relevant to semi-solid media M such as waxes. Upon connecting the mouthpiece module 44 to the atomizer module 40, the portion of wax media M is deposited onto the top surface of the top wall 84 of the heating element 80, as depicted in FIG. 14*a*.

In accordance with one embodiment, once the vaporizer 30 is loaded with wax media M as depicted in FIG. 14*a*, the user can press the button 34 on the battery module 32 to signal the battery to supply electric current to the heating element 80. Preferably, the current causes the heating element 80 to heat up sufficient to warm, but not atomize, the media M. As such, and as shown in FIG. 14*b*, the media M will melt, becoming less viscous, and flow off of the top surface of the top wall 84 and into the vaporization space 100. Most preferably, the user holds the vaporizer 30 in an upright position during the warming phase.

With referenced next to FIG. 14*c*, after the media has been warmed and has fully or partially flowed into the vaporization space 100, the user can again press the button 34, and the controller will direct sufficient current to the heating element 80 to atomize media M within the vaporization space 100 adjacent the side wall 82. The top wall 84 of the heating element 80 is also warmed, but preferably is not as hot as the side wall 82, so that media remaining on the top wall 84 continues to be melted so as to flow into the vaporization space 100. While the media M in the vaporization space 100 is being atomized, the user also draws a breath through the mouthpiece. As such, environmental air A is drawn through air inlets into and through the check valve 70 and air guide 60 into the air warming space 86.

In preferred embodiments, the heating element 80 emits heat not only from the outer surfaces of the side wall 82 and top wall 84 but also from the inner surfaces of such walls. Thus, air A is heated as it flows through the air warming space 86. Also, as depicted in the illustrated embodiment, the air flow path changes direction 180° within the air warming space 86, inducing a turbulent air flow enhancing distribution of air A within the air warming space 86 and increasing uniformity of warming. The warmed, turbulent air flows through the spaces 92 into the vaporization space 100 where it proceeds through atomized media M. Preferably, the airflow remains turbulent. Atomized media M becomes entrained in the air A so as to form a vapor V. The vapor makes its way upwardly through the bowl space 58, past the media carrier 120, to and through the redirect passages 114 and into the mouthpiece passage 106, from which it exits through the vapor outlet 108 and into the user's mouth.

Figure 16:
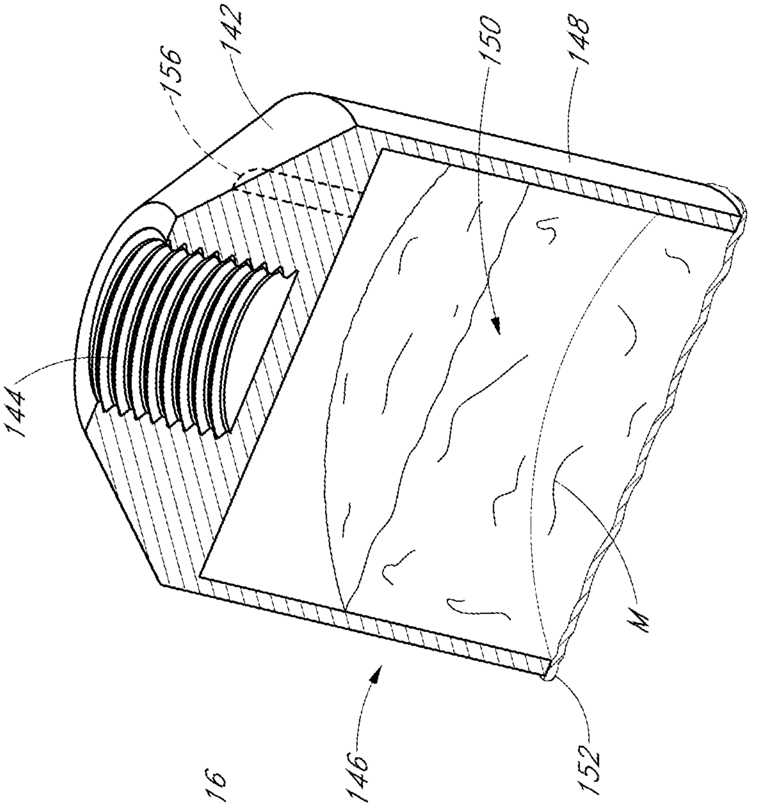
FIG. 16 is a cross-sectional view taken along line 16-16 of FIG. 15.
Figure 15:
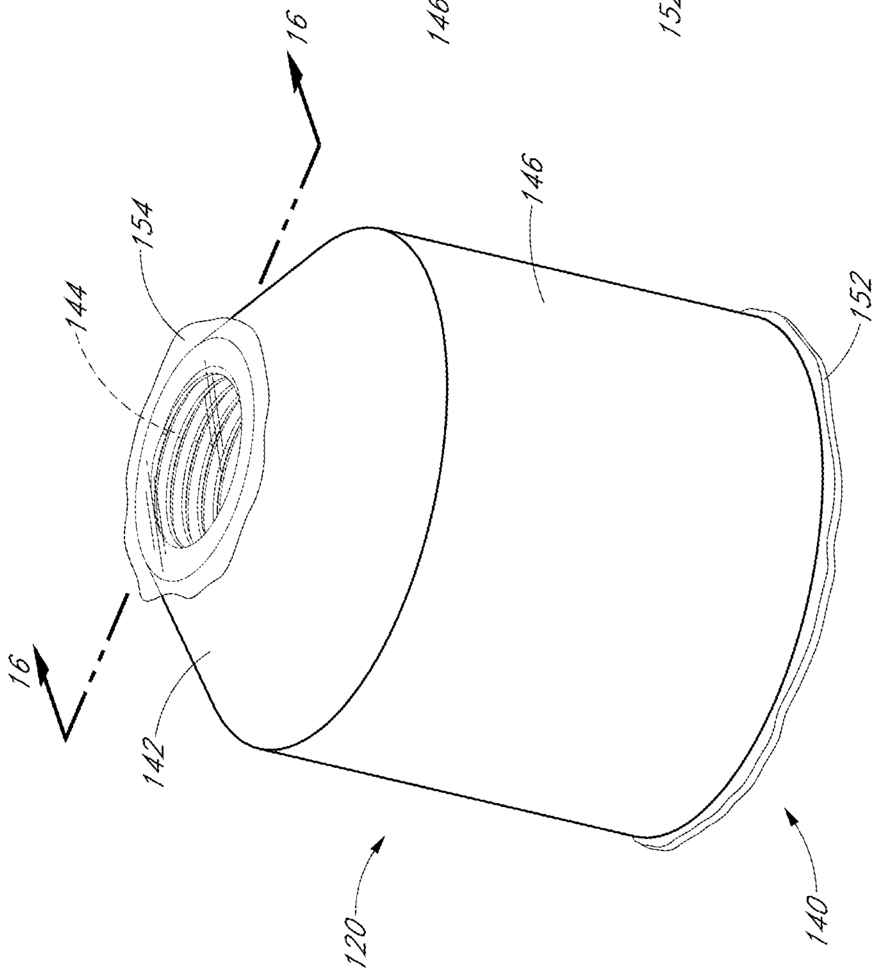
FIG. 15 is a perspective view of a media carrier configured in accordance with an embodiment.

With reference next to FIGS. 15 and 16, another embodiment of a media carrier 120 comprises a wax container 140 made up of a proximal zone 142 having a threaded proximal connector 144 and a container portion 146 comprising a tubular wall 148 defining a container space 150. Preferably, a distal end of the container space 150 is open. In a preferred embodiment, the container space 150 can be substantially filled with a wax media M. In some embodiments, the container space 150 is preloaded—filled at a location remote from where the user plans to use the media M. In some embodiments, a film 152 can be applied across the open distal end of the container space 150. A film 154 can also be applied across an aperture that may be formed in the proximal connector or, in some embodiments, a distal portion of the threaded proximal connector 144 can include a transverse wall so that there is no such aperture. As such, a preloaded wax container 140 can be provided which is remotely pre-filled with media M and sealed from the environment by the film layer(s). In some embodiments, the distal film layer 152 is configured with a tab so that a user can peel the film layer(s) off before using the filled wax container. In another embodiment, the distal film can be made of a membrane material that is configured to readily melt upon application of warming heat. Preloaded containers 140 enclosed with a film layer 152 can also be advantageously used with other types of vaporization media, such as ground herbs and low-viscosity fluids such as oils or e-liquids.

In some embodiments, a wax container 140 as in FIGS. 15 and 16 can be provided empty. A user attaches the container's proximal connector 144 to the media connector 112 of the vaporizer 30 mouthpiece. The user can then scoop vaporizing media M from a source of media using the open distal end of the container portion 146. In some such embodiments, the proximal portion 142 can include one or more air passages 156 so that a user can advance the container portion 146 directly into a source of media M, and air within the container space 150 can evacuate through the air passage 156 as media fills the container space 150.

Figure 17C:
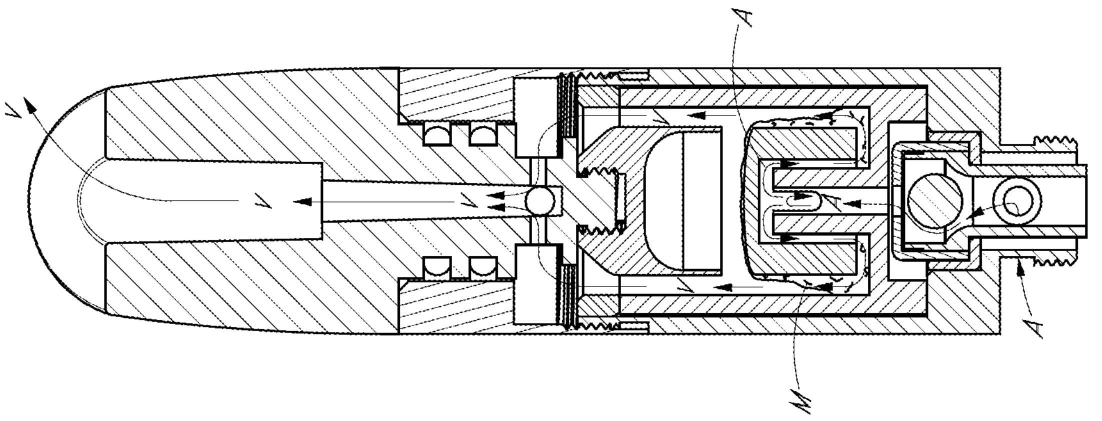
FIG. 17*c* shows the configuration of FIG. 17*a* at a third instance during operation.
Figure 17B:
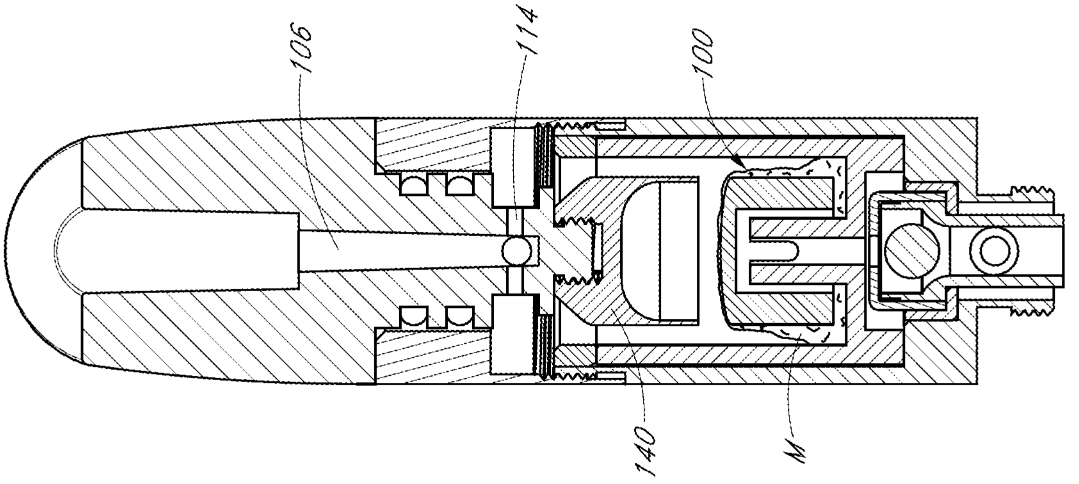
FIG. 17*b* shows the configuration of FIG. 17*a* at a second instance during operation.
Figure 17A:
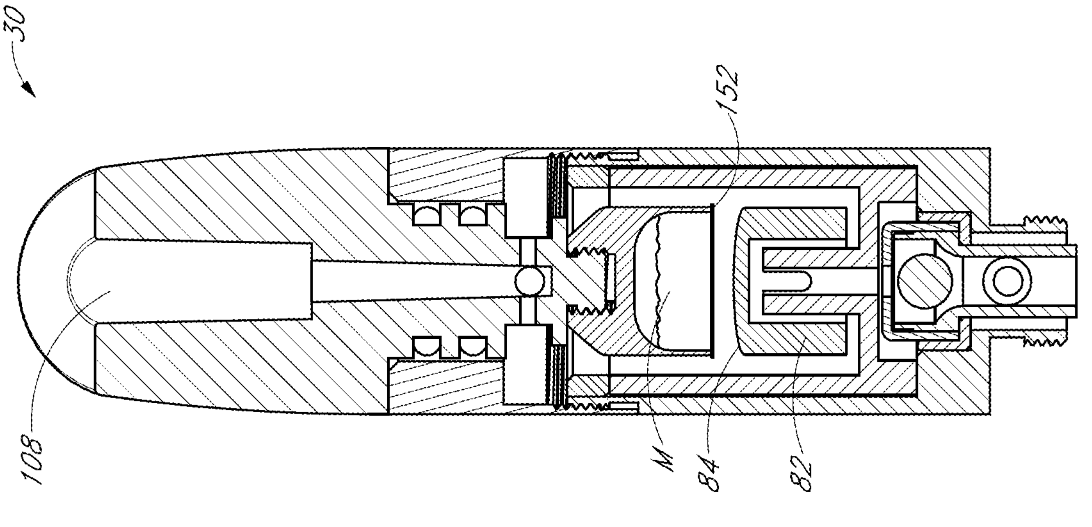
FIG. 17*a* is a cross-sectional view of a vaporizer incorporating the media carrier of FIG. 15, shown at a first instance during operation.

With additional reference next to FIGS. 17*a-c*, a filled wax container 140 is attached to the mouthpiece module 44, which is then reattached to the rest of the vaporizer 30. The mouthpiece module 44 is then attached to the atomizer module 40 so that the distal end of the container portion 146 is disposed immediately adjacent a top surface 84 of the heating element 80. Upon application of heat by the heating element 80, the film 152 (if present) will readily melt, media M will also melt and will exit the container space 150 and flow across the top wall 84 downwardly into the vaporization space 100. In some embodiments, and as indicated in FIG. 17*b*, melted media can flow downwardly into contact with the bottom wall 56 of the bowl 50 and a portion can further flow through the spaces 92 adjacent the heating element distal end and proximally so that portions of media M are disposed on both sides of the heating element side wall 82. Upon application of atomizing heat and drawing of a breath by the user, air A is heated and drawn through atomized media M to form a vapor V. It is to be understood that spaces on both sides of the heating element side wall 82 can be considered vaporization spaces 100.

FIGS. 17*a-c* depict a heating element 80 embodiment in which a top surface of the heating element top wall 84 is rounded so as to be tapered downwardly from a center, or axial, part of the top surface. Thus, melted media M is more readily directed off of the top wall 84 and into the vaporization space 100. It is to be understood that various configurations of heating elements can be provided and configured to preferentially direct flow of melted media. In the illustrated embodiment, intake air is delivered along the axis of the vaporizer 30, and the vaporization space 100 is defined concentrically surrounding the heating element 80. Additional embodiments may employ different configurations, such as the top surface of the heating element extending to the side wall 54 of the bowl 50 along a portion of its circumference and the air warming space 86 being disposed generally on the same side. Preferably, air from the air warming space 86 is directed to the opposite side of the bowl 50 so that the vaporization space 100 is also defined along only a part of the circumference of the bowl 50. Further, the heating element can be shaped so as to direct melted media M toward the side-arranged vaporization space 100. In additional embodiments the top wall can be configured with a spike-shaped member configured to puncture the film layer when the media carrier 120 is advanced into position with the mouthpiece module 44.

Figure 19:
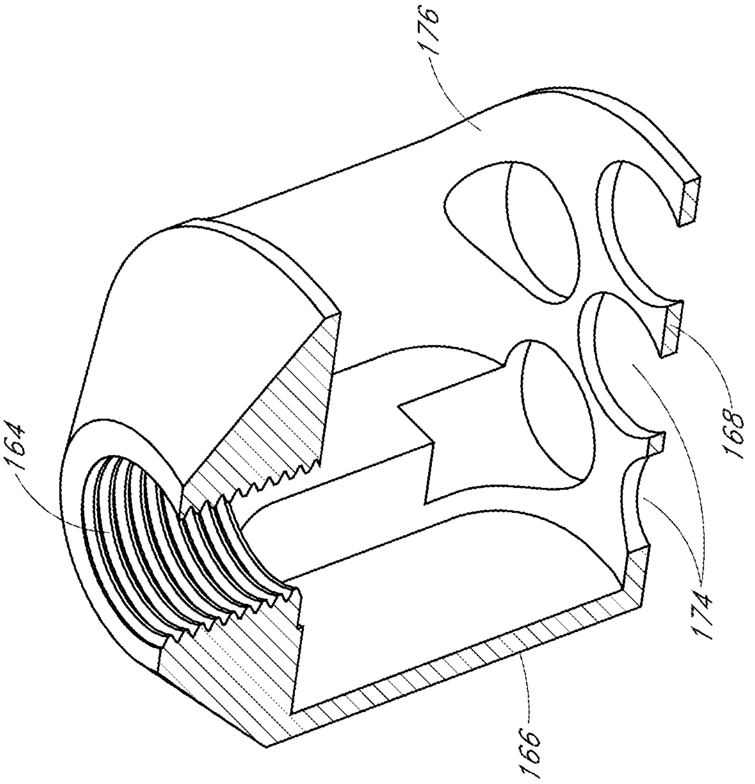
FIG. 19 is a cross-sectional view taken along line 19-19 of FIG. 18.
Figure 18:
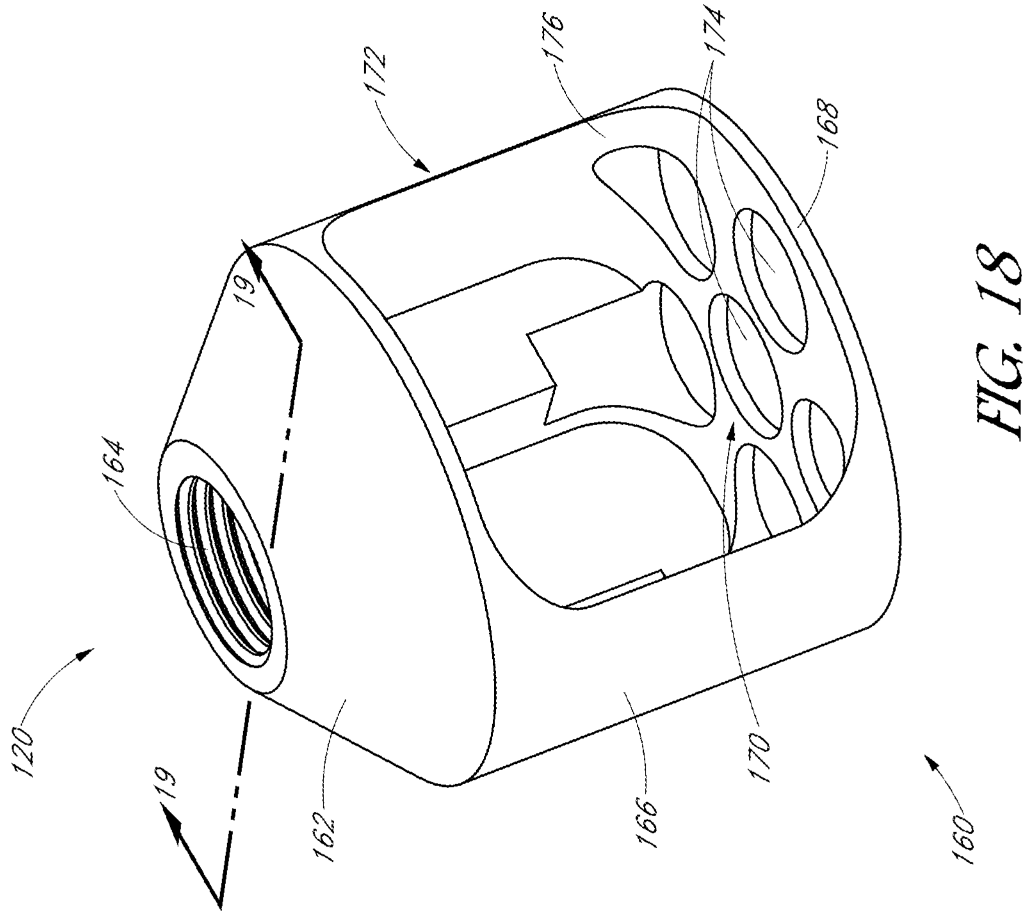
FIG. 18 is a perspective view of another embodiment of a media carrier.

With reference next to FIGS. 18 and 19, another embodiment of a media carrier 120 comprises a barrel scoop 160 having a proximal portion 162 with a proximal connector 164 adapted to be threadingly attached to the mouthpiece's media connector 112. A tubular side wall 166 extends distally from the proximal portion 162 and terminates in a bottom wall 168. A container space 170 is defined within the tubular side wall 166. A portion of the side wall is removed, defining a scoop opening 172. A plurality of apertures 174 are formed through the bottom wall 168, and guide structures 176 are configured to direct melted media M that may be within the container space 170 toward the apertures. In this embodiment, when the barrel scoop 160 is attached to the mouthpiece module 44, the user may scoop media M using the opening 172, thus loading the container space 170. After the mouthpiece module 44 is attached to the vaporizer and heat is applied so as to melt the media M, the media will flow through the apertures 174 to the top wall 84 of the heating element 80 and further to the vaporization space 100.

Figure 20:
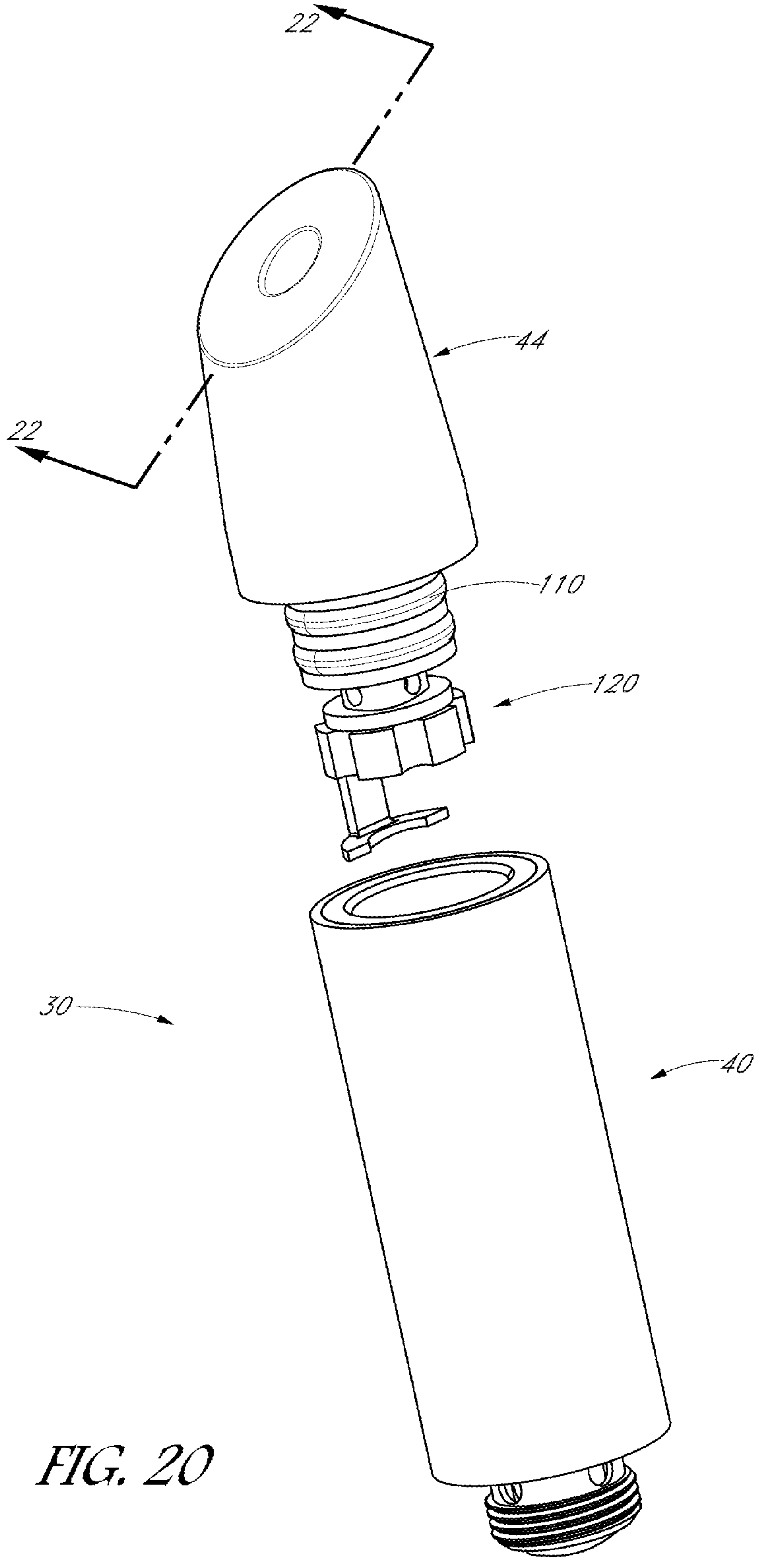
FIG. 20 is an exploded perspective view of yet another embodiment of a vaporizer.
Figure 21:
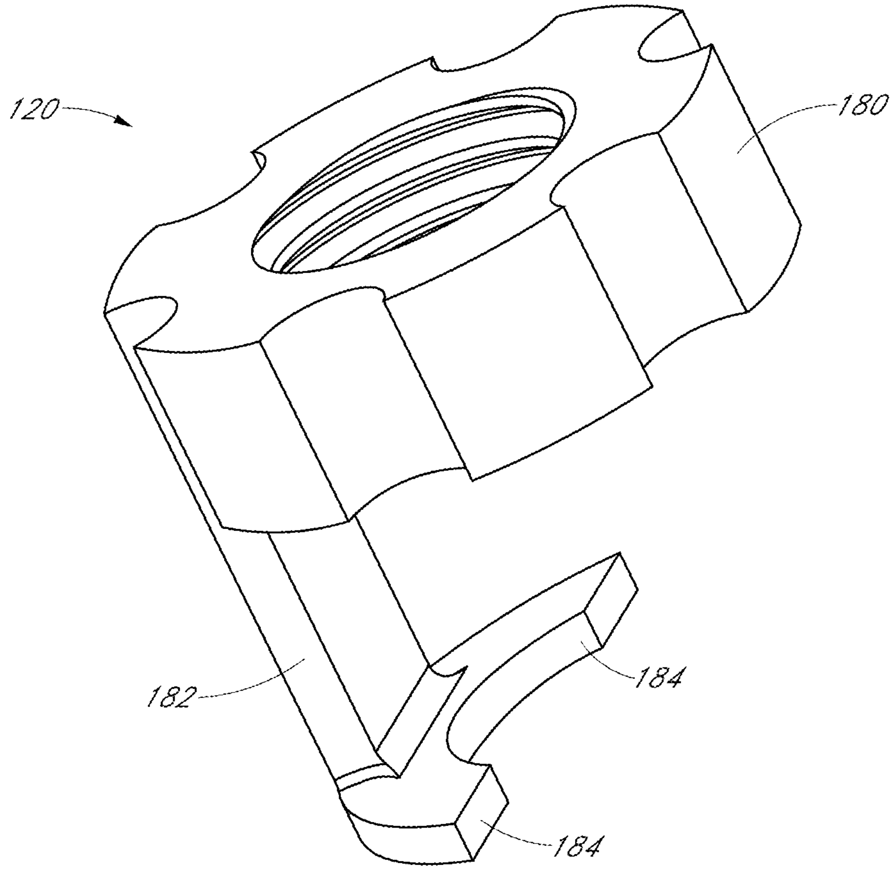
FIG. 21 is a perspective view of an embodiment of a media carrier employed in the vaporizer embodiment depicted in FIG. 20.
Figure 22:
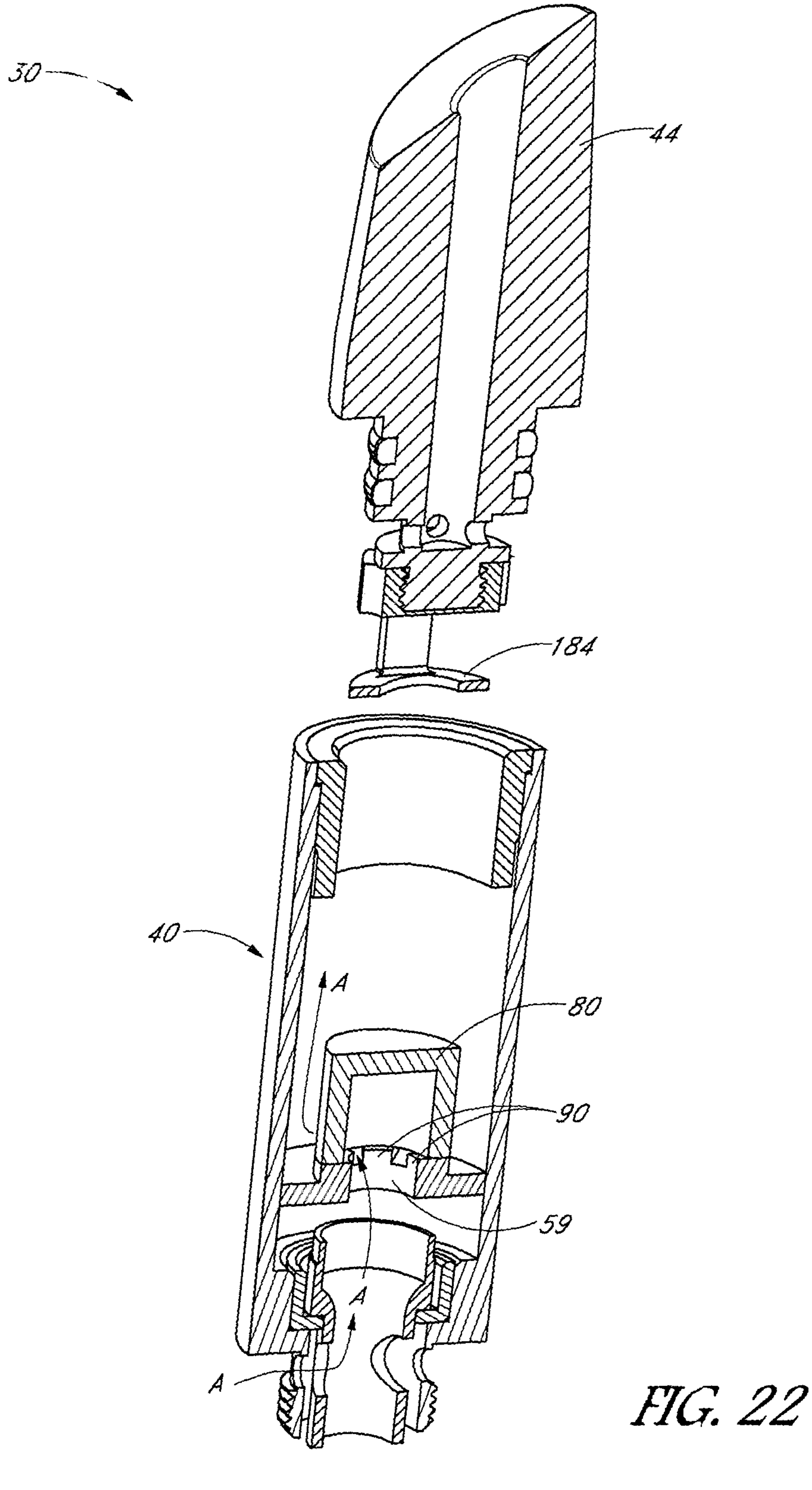
FIG. 22 is a cross-sectional view taken along line 22-22 of FIG. 20.

With reference next to FIGS. 20-22 still another embodiment of a vaporizer 30 is illustrated in which, as depicted in FIG. 22, intake air A can flow through a bottom wall aperture 59 to enter the air warming space 86. However, the aperture 59 does not, in this embodiment, comprise an elongated tubular air guide 60. Also, and as depicted in this embodiment, the media carrier 120 comprises a proximal connector 180 configured to attach to the media connector 112 of the mouthpiece module 44. A side support 182 extends distally from a portion of the proximal connector radially spaced from an axis of the atomizer module 40. A pair of scooper tongs 184 extend transversely from a distal end of the side support 182. The illustrated scooper tongs 184 have an arcuate shape generally corresponding to the circumferential cross-sectional shape of the bowl 50 but extending along only a portion of the circumference of the bowl 50. In the illustrated embodiment, the scooper tongs 184 extend transversely about halfway across the bowl 50. In use, a user scoops wax media M from a source of such media using the scooper tongs 184 so that the media is supported on the tongs 184. The mouthpiece module 44 is then inserted into the atomizer module 40. Due to the spacing of the scooper tongs 184, media M supported by the scooper tongs 184 is placed generally centrally above the top wall 84 of the heating element 80 within the vaporizer 30.

In the embodiments discussed above, intake air enters the vaporizer 30 distal of the vaporization space 100. It is to be understood that, in additional embodiments, other configurations can be employed so that, for example, intake air enters the vaporizer 30 proximal of the vaporization space 100.

The controller actuated by the button can employ a plurality of different methods and modes for directing electric current to the heating element 80. For example, in some embodiments, a first button push will supply only heat to warm, not atomize, the media, and a second button push supplies increased heat that is sufficient to atomize media within the vaporization space 100. In some embodiments, warming is accomplished only when the first button is being held down; in others, a single push triggers warming for a predetermined time and/or until a sensor within the vaporization space 100 has detected a preselected temperature for a predetermined time. In still other embodiments, a single button push triggers warming, and a double-push triggers atomization heat. Further, in some embodiments, a user can use the button and/or a remote computing device to access the controller and select aspects such as operation modes and selected temperatures.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A personal vaporizer, comprising:

an atomizer module having an atomizer bowl defined by a bowl bottom wall and a bowl side wall extending from the bowl bottom wall, the atomizer bowl opening toward a top end;

a cup-shaped member disposed within the atomizer bowl, the cup-shaped member having a top wall and a side wall extending downwardly from the top wall, the side wall being tubular;

a heating member configured to atomize a vaporization media when actuated, the heating member configured to heat the cup-shaped member side wall;

a vaporization space defined between the cup-shaped member side wall and the bowl side wall, the vaporization media disposed in the vaporization space on the cup-shaped member side wall;

a bottom wall aperture formed through the bowl bottom wall on a side of the cup-shaped member side wall opposite the vaporization space; and a fluid pathway that extends through the atomizer module, the fluid pathway extending across a surface of the cup-shaped member top wall before flowing into the vaporization space, the fluid pathway also extending through the bottom wall aperture.

2. The personal vaporizer of claim 1, wherein the heating member comprises a heating wire having a first wire end and a second wire end that extend from the cup-shaped member side wall.

3. The personal vaporizer of claim 1, wherein the cup-shaped member top wall has an upper surface and a lower surface, and wherein the lower surface faces the bottom wall aperture.

4. The personal vaporizer of claim 3 additionally comprising an air guide extending upwardly from the bowl bottom wall and communicating with the bottom wall aperture.

5. The personal vaporizer of claim 4, wherein a plurality of spaced apart blocks extend proximally from the bottom wall of the atomizer bowl, and wherein the cup-shaped member side wall rests upon the blocks, and wherein the fluid pathway extends between the spaced apart blocks, and the air guide has an upper edge that is spaced proximally from the blocks.

6. The personal vaporizer of claim 5, wherein the fluid pathway extends proximally through the air guide then distally within the cup-shaped member then radially between the blocks, cup-shaped member side wall and the bottom wall of the atomizer bowl and into the vaporization space.

7. The personal vaporizer of claim 3, wherein the fluid pathway extends through the bottom wall aperture and across the lower surface of the cup-shaped member top wall before flowing into the vaporization space.

8. The personal vaporizer of claim 7, wherein a plurality of spaced apart blocks extend proximally from the bottom wall of the atomizer bowl, and wherein the cup-shaped member side wall rests upon the blocks, and wherein the fluid pathway extends between the spaced apart blocks.

9. The personal vaporizer of claim 1, wherein the heating member is enclosed within the cup-shaped member.

10. The personal vaporizer of claim 9, wherein the heating member is configured to deliver more heat to the cup-shaped member side wall than to the cup-shaped member top wall.

11. The personal vaporizer of claim 10, wherein the cup-shaped member is configured so that a portion of heat within the cup-shaped member side wall is communicated to the cup-shaped member top wall.

* * * * *